United States Patent
Turgeman et al.

(10) Patent No.: US 10,069,852 B2
(45) Date of Patent: *Sep. 4, 2018

(54) DETECTION OF COMPUTERIZED BOTS AND AUTOMATED CYBER-ATTACK MODULES

(71) Applicant: BioCatch Ltd., Tel Aviv (IL)

(72) Inventors: Avi Turgeman, Cambridge, MA (US); Itai Novick, Rehovot (IL)

(73) Assignee: BIOCATCH LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,035

(22) Filed: Dec. 13, 2017

(65) Prior Publication Data
US 2018/0103047 A1    Apr. 12, 2018

Related U.S. Application Data

(63) Continuation-in-part of application No. 15/465,623, filed on Mar. 22, 2017, now Pat. No. 9,848,009, (Continued)

(51) Int. Cl.
*H04L 29/06*   (2006.01)
*G06Q 20/40*   (2012.01)
(Continued)

(52) U.S. Cl.
CPC .......... *H04L 63/1416* (2013.01); *G01R 29/26* (2013.01); *G06F 21/121* (2013.01);
(Continued)

(58) Field of Classification Search
CPC ................................................. H04L 63/1416
See application file for complete search history.

(56) References Cited

U.S. PATENT DOCUMENTS 3,618,019 A    11/1971   Nemirovsky et al.
3,699,517 A    10/1972   Dyche
(Continued)

FOREIGN PATENT DOCUMENTS

EP    2410450    1/2012
EP    2477136    7/2012
(Continued)

OTHER PUBLICATIONS

Ahmed et al., "A New Biometric Technology Based on Mouse Dynamics", Jul.-Sep. 2007, IEEE Transactions on Dependable and Secure Computing, vol. 4, No. 3, pp. 165-179.
(Continued)

*Primary Examiner* — Shawnchoy Rahman
(74) *Attorney, Agent, or Firm* — Eitan, Mehulal & Sadot

(57) ABSTRACT

Devices, systems, and methods of detecting whether an electronic device or computerized device or computer, is being controlled by a legitimate human user, or by an automated cyber-attack unit or malware or automatic script. The system monitors interactions performed via one or more input units of the electronic device. The system searches for abnormal input-user interactions; or for an abnormal discrepancy between: the input-unit gestures that were actually registered by the input unit, and the content that the electronic device reports as allegedly entered via such input units. A discrepancy or abnormality indicates that more-possibly, or necessarily or certainly, a malware or automated script is controlling the electronic device, rather than a legitimate human user. Optionally, an input-output aberration or interference is injected, in order to check for manual corrective actions that only a human user, and not an automated script, is able to perform.

9 Claims, 3 Drawing Sheets

Related U.S. Application Data which is a continuation-in-part of application No. 15/198,199, filed on Jun. 30, 2016, now Pat. No. 9,626,677, which is a continuation-in-part of application No. 15/194,593, filed on Jun. 28, 2016, and a continuation-in-part of application No. 14/736,287, filed on Jun. 11, 2015, now Pat. No. 9,690,915, and a continuation-in-part of application No. 14/325,394, filed on Jul. 8, 2014, now Pat. No. 9,547,766, and a continuation-in-part of application No. 14/325,393, filed on Jul. 8, 2014, now Pat. No. 9,531,733, which is a continuation-in-part of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942.

(60) Provisional application No. 62/190,264, filed on Jul. 9, 2015, provisional application No. 61/843,915, filed on Jul. 9, 2013, provisional application No. 61/417,479, filed on Nov. 29, 2010.

(51) Int. Cl.
| | | |
|---|---|---|
| *G01R 29/26* | (2006.01) | |
| *G06F 21/12* | (2013.01) | |
| *G06F 21/31* | (2013.01) | |
| *G06F 21/55* | (2013.01) | |

(52) U.S. Cl.
CPC .......... *G06F 21/316* (2013.01); *G06F 21/552* (2013.01); *G06F 21/554* (2013.01); *G06Q 20/4014* (2013.01); *G06Q 20/4016* (2013.01); *H04L 63/08* (2013.01); *H04L 63/126* (2013.01); *H04L 63/1441* (2013.01); *G06F 2221/2133* (2013.01); *H04L 63/083* (2013.01); *H04L 63/102* (2013.01); *H04L 2463/082* (2013.01); *H04L 2463/144* (2013.01)

(56) References Cited

U.S. PATENT DOCUMENTS

| | | |
|---|---|---|
| 3,983,535 A | 9/1976 | Herbst et al. |
| 4,128,829 A | 12/1978 | Herbst et al. |
| 4,621,334 A | 11/1986 | Garcia |
| 4,760,386 A | 7/1988 | Heath et al. |
| 4,805,222 A | 2/1989 | Young et al. |
| 5,305,238 A | 4/1994 | Starr et al. |
| 5,485,171 A | 1/1996 | Copper et al. |
| 5,557,686 A | 9/1996 | Brown et al. |
| 5,581,261 A | 12/1996 | Hickman et al. |
| 5,838,306 A | 11/1998 | O'Connor et al. |
| 5,874,941 A | 2/1999 | Yamada |
| 6,202,023 B1 | 3/2001 | Hancock et al. |
| 6,337,686 B2 | 1/2002 | Wong et al. |
| 6,337,919 B1 | 1/2002 | Dunton |
| 6,572,014 B1 | 6/2003 | Lambert |
| 6,819,219 B1 | 11/2004 | Bolle |
| 6,931,131 B1 | 8/2005 | Becker et al. |
| 6,938,061 B1 | 8/2005 | Rumynin et al. |
| 6,938,159 B1 | 8/2005 | O'Connor et al. |
| 6,957,185 B1 | 10/2005 | Labaton |
| 6,957,186 B1 | 10/2005 | Guheen et al. |
| 6,983,061 B2 | 1/2006 | Ikegami et al. |
| 7,130,452 B2 | 10/2006 | Bolle et al. |
| 7,133,792 B2 | 11/2006 | Murakami et al. |
| 7,139,916 B2 | 11/2006 | Billingsley et al. |
| 7,245,218 B2 | 7/2007 | Ikehara et al. |
| 7,366,919 B1 | 4/2008 | Sobel et al. |
| 7,395,436 B1 | 7/2008 | Nemovicher |
| 7,494,061 B2 | 2/2009 | Reinhold |
| 7,523,191 B1 | 4/2009 | Thomas et al. |
| 7,606,915 B1 | 10/2009 | Calinov et al. |
| 7,796,013 B2 | 9/2010 | Murakami et al. |
| 7,818,290 B2 | 10/2010 | Davis et al. |
| 8,285,658 B1 | 10/2012 | Kellas-Dicks et al. |
| 8,417,960 B2 | 4/2013 | Takahashi et al. |
| 8,433,785 B2 | 4/2013 | Awadallah et al. |
| 8,510,113 B1 | 8/2013 | Conkie et al. |
| 8,548,208 B2 | 10/2013 | Schultz |
| 8,549,629 B1 | 10/2013 | Mccreesh et al. |
| 9,154,534 B1 | 10/2015 | Gayles et al. |
| 9,174,123 B2 | 11/2015 | Nasiri et al. |
| 9,282,112 B2 | 3/2016 | Filatov |
| 9,301,140 B1 | 3/2016 | Costigan et al. |
| 9,304,915 B2 | 4/2016 | Adams et al. |
| 2001/0004733 A1 | 6/2001 | Eldering |
| 2002/0089412 A1 | 7/2002 | Heger et al. |
| 2003/0033526 A1 | 2/2003 | French et al. |
| 2003/0074201 A1 | 4/2003 | Grashey et al. |
| 2003/0212811 A1 | 11/2003 | Thornton |
| 2004/0015714 A1 | 1/2004 | Abraham et al. |
| 2004/0062423 A1 | 4/2004 | Doi |
| 2004/0111523 A1 | 6/2004 | Hall et al. |
| 2005/0008148 A1 | 1/2005 | Jacobson |
| 2005/0060138 A1 | 3/2005 | Wang et al. |
| 2005/0179657 A1 | 8/2005 | Russo et al. |
| 2005/0289264 A1 | 12/2005 | Illowsky et al. |
| 2006/0006803 A1 | 1/2006 | Huang et al. |
| 2006/0143454 A1 | 6/2006 | Walmsley |
| 2006/0195328 A1 | 8/2006 | Abraham et al. |
| 2006/0215886 A1 | 9/2006 | Black |
| 2006/0224898 A1 | 10/2006 | Ahmed |
| 2006/0282660 A1 | 12/2006 | Varghese et al. |
| 2006/0284969 A1 | 12/2006 | Kim et al. |
| 2007/0118804 A1 | 5/2007 | Raciborski et al. |
| 2007/0183633 A1 | 8/2007 | Hoffmann |
| 2007/0214426 A1 | 9/2007 | Ruelle et al. |
| 2007/0255821 A1 | 11/2007 | Ge et al. |
| 2007/0266305 A1 | 11/2007 | Cong et al. |
| 2007/0271466 A1 | 11/2007 | Mak et al. |
| 2007/0283416 A1 | 12/2007 | Renaud |
| 2008/0059474 A1 | 3/2008 | Lim |
| 2008/0091639 A1 | 4/2008 | Davis et al. |
| 2008/0092209 A1 | 4/2008 | Davis et al. |
| 2008/0162449 A1 | 7/2008 | Chao-Yu et al. |
| 2008/0183745 A1 | 7/2008 | Cancel et al. |
| 2008/0211766 A1 | 9/2008 | Westerman et al. |
| 2008/0215576 A1 | 9/2008 | Zhao et al. |
| 2008/0301808 A1 | 12/2008 | Calo et al. |
| 2009/0089879 A1 | 4/2009 | Wang et al. |
| 2009/0094311 A1 | 4/2009 | Awadallah et al. |
| 2009/0189736 A1 | 7/2009 | Hayashi |
| 2009/0199296 A1 | 8/2009 | Xie et al. |
| 2009/0254336 A1 | 10/2009 | Dumais et al. |
| 2009/0293119 A1 | 11/2009 | Jonsson |
| 2009/0320123 A1 | 12/2009 | Yu et al. |
| 2010/0042403 A1 | 2/2010 | Chandrasekar et al. |
| 2010/0046806 A1 | 2/2010 | Baughman et al. |
| 2010/0077470 A1 | 3/2010 | Kozat et al. |
| 2010/0082747 A1 | 4/2010 | Yue et al. |
| 2010/0082998 A1 | 4/2010 | Kohavi |
| 2010/0122082 A1 | 5/2010 | Deng et al. |
| 2010/0125816 A1 | 5/2010 | Bezos |
| 2010/0281539 A1 | 11/2010 | Burns et al. |
| 2010/0287229 A1 | 11/2010 | Hauser |
| 2010/0328074 A1 | 12/2010 | Johnson et al. |
| 2011/0012829 A1 | 1/2011 | Yao |
| 2011/0016320 A1 | 1/2011 | Bergsten et al. |
| 2011/0023115 A1 | 1/2011 | Wright |
| 2011/0029902 A1 | 2/2011 | Bailey |
| 2011/0063211 A1 | 3/2011 | Hoerl et al. |
| 2011/0065504 A1 | 3/2011 | Dugan et al. |
| 2011/0102570 A1 | 5/2011 | Wilf et al. |
| 2011/0113388 A1 | 5/2011 | Eisen et al. |
| 2011/0154273 A1 | 6/2011 | Aburada et al. |
| 2011/0162076 A1 | 6/2011 | Song et al. |
| 2011/0191820 A1 | 8/2011 | Ivey |
| 2011/0193737 A1 | 8/2011 | Chiueh |
| 2011/0202453 A1 | 8/2011 | Issa et al. |
| 2011/0246902 A1 | 10/2011 | Tsai et al. |

(56) References Cited

U.S. PATENT DOCUMENTS

| | | |
|---|---|---|
| 2011/0251823 A1 | 10/2011 | Davis et al. |
| 2011/0271342 A1 | 11/2011 | Chung et al. |
| 2011/0276414 A1 | 11/2011 | Subbarao et al. |
| 2011/0320822 A1 | 12/2011 | Lind et al. |
| 2012/0005483 A1 | 1/2012 | Patvarczki et al. |
| 2012/0054834 A1 | 3/2012 | King |
| 2012/0096555 A1 | 4/2012 | Mahaffey |
| 2012/0133055 A1 | 5/2012 | Machida |
| 2012/0151559 A1 | 6/2012 | Koudys et al. |
| 2012/0154173 A1 | 6/2012 | Chang et al. |
| 2012/0154273 A1 | 6/2012 | Mcdade et al. |
| 2012/0154823 A1 | 6/2012 | Sakamoto |
| 2012/0158503 A1 | 6/2012 | Mardikar |
| 2012/0167170 A1 | 6/2012 | Shi |
| 2012/0218193 A1 | 8/2012 | Weber et al. |
| 2012/0278804 A1 | 11/2012 | Narayanasamy et al. |
| 2013/0036416 A1 | 2/2013 | Raju et al. |
| 2013/0097682 A1 | 4/2013 | Zeljkovic et al. |
| 2013/0097706 A1 | 4/2013 | Titonis et al. |
| 2013/0111586 A1 | 5/2013 | Jackson |
| 2013/0133055 A1 | 5/2013 | Ali et al. |
| 2013/0135218 A1 | 5/2013 | Jain |
| 2013/0154999 A1 | 6/2013 | Guard |
| 2013/0167212 A1 | 6/2013 | Azar et al. |
| 2013/0305357 A1 | 11/2013 | Ayyagari et al. |
| 2014/0033317 A1 | 1/2014 | Barber |
| 2014/0078061 A1 | 3/2014 | Simons et al. |
| 2014/0078193 A1 | 3/2014 | Barnhoefer et al. |
| 2014/0082369 A1 | 3/2014 | Waclawsky et al. |
| 2014/0143304 A1 | 5/2014 | Hegarty et al. |
| 2014/0196119 A1 | 7/2014 | Hill et al. |
| 2014/0200953 A1 | 7/2014 | Mun |
| 2014/0250538 A1 | 9/2014 | Rapaport et al. |
| 2014/0259130 A1 | 9/2014 | Li et al. |
| 2014/0270571 A1 | 9/2014 | Dwan et al. |
| 2014/0283059 A1 | 9/2014 | Sambamurthy et al. |
| 2014/0317734 A1 | 10/2014 | Valencia et al. |
| 2014/0344927 A1 | 11/2014 | Turgeman et al. |
| 2015/0012920 A1 | 1/2015 | De Santis et al. |
| 2015/0101031 A1 | 4/2015 | Harjanto et al. |
| 2015/0213251 A1 | 7/2015 | Turgeman |
| 2016/0006800 A1 | 1/2016 | Summers et al. |
| 2016/0042164 A1 | 2/2016 | Goldsmith et al. |
| 2016/0164905 A1 | 6/2016 | Pinney Wood et al. |
| 2016/0164906 A1 | 6/2016 | Pinney Wood et al. |
| 2017/0048272 A1 | 2/2017 | Yamamura et al. |

FOREIGN PATENT DOCUMENTS

| | | |
|---|---|---|
| EP | 2610776 | 7/2013 |
| WO | 2005099166 | 10/2005 |
| WO | 2007146437 | 12/2007 |
| WO | 2012073233 | 6/2012 |

OTHER PUBLICATIONS

Bailey, Kyle O., "Computer Based Behavioral Biometric Authentication via Multi-Modal Fusion", Thesis, 2013, Air Force Insitute of Technology.

Stinson et al., "Characterizing Bots' Remote Control Behavior". Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Franklin et al., "Remote Detection of Virtual Machine Monitors with Fuzzy benchmarking", ACM SIGOPS Operating Systems Review, V42, Issue 3, Apr. 2008.

Georgia Frantzeskou et al., "Identifying Authorship by Byte-Level N-Grams: The source Code Author Profile (SCAP) Method", Spring 2007, International Journal of Digital Evidence, vol. 6, issue 1.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Zheng et al., "An Efficient User Verification System via Mouse Movements", Oct. 17-21, 2011, CCS' 11, Chicago, Illinois.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Spafford et al., "Software Forensics: Can We Track Code to its Authors?", Feb. 1992, Computer Science Technical Report, Purdue e-Pubs, Report No. CSD-TR-92-010.

Garfinkel and Rosenblum, "A virtual Machine Introspection-Based Architecture for Intrusion Detection.", 2003, Proc. Network and Distributed Systems Security Symp., The Internet Society, pp. 191-206.

Nance et al., "Virtual Machine Introspection", IEEE Security & Privacy, 2008.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

International Search Report for application PCT/IL2011/000907 dated Apr. 19, 2012.

International Search Report for application PCT/IB2014/062293 dated Oct. 1, 2014.

International Search Report for application PCT/IB2014/062941 dated Dec. 17, 2014.

International Search Report for application PCT/IB2016/054064 dated Nov. 21, 2016.

Supplementary European Search Report for application 11844440 dated Nov. 17, 2017.

DETECTION OF COMPUTERIZED BOTS AND AUTOMATED CYBER-ATTACK MODULES

CROSS-REFERENCE TO RELATED APPLICATIONS

This application is a Continuation-In-Part (CIP) of U.S. patent application Ser. No. 15/465,623, filed on Mar. 22, 2017, which is being issued as U.S. Pat. No. 9,848,009, which is hereby incorporated by reference in its entirety.

The above-mentioned U.S. patent application Ser. No. 15/465,623 is a Continuation-In-Part (CIP) of U.S. patent application Ser. No. 15/198,199, filed on Jun. 30, 2016, now U.S. Pat. No. 9,626,677, which is hereby incorporated by reference in its entirety.

The above-mentioned U.S. patent application Ser. No. 15/198,199 claims priority and benefit from U.S. provisional patent application No. 62/190,264, filed on Jul. 9, 2015, which is hereby incorporated by reference in its entirety.

The above-mentioned U.S. patent application Ser. No. 15/198,199 is a Continuation-In-Part (CIP) of U.S. patent application Ser. No. 14/736,287, filed on Jun. 11, 2015, now U.S. Pat. No. 9,690,915, which is hereby incorporated by reference in its entirety.

The above-mentioned U.S. patent application Ser. No. 15/198,199 is a Continuation-In-Part (CIP) of U.S. patent application Ser. No. 14/325,394, filed on Jul. 8, 2014, now U.S. Pat. No. 9,547,766, which is hereby incorporated by reference in its entirety.

The above-mentioned U.S. patent application Ser. No. 15/198,199 is a Continuation-In-Part (CIP) of U.S. patent application Ser. No. 15/194,593, filed on Jun. 28, 2016, which is hereby incorporated by reference in its entirety.

The above-mentioned U.S. patent application Ser. No. 15/198,199 is a Continuation-In-Part (CIP) of U.S. patent application Ser. No. 14/325,393, filed on Jul. 8, 2014, now U.S. Pat. No. 9,531,733, which is hereby incorporated by reference in its entirety.

The above-mentioned U.S. patent application Ser. No. 14/325,393 claims priority and benefit from U.S. provisional patent application No. 61/843,915, filed on Jul. 9, 2013, which is hereby incorporated by reference in its entirety.

The above-mentioned U.S. patent application Ser. No. 14/325,393 is a Continuation-in-Part (CIP) of U.S. patent application Ser. No. 13/922,271, filed on Jun. 20, 2013, now U.S. Pat. No. 8,938,787, which is hereby incorporated by reference in its entirety. The above-mentioned U.S. patent application Ser. No. 13/922,271 is a Continuation-in-Part (CIP) of U.S. patent application Ser. No. 13/877,676, filed on Apr. 4, 2013, now U.S. Pat. No. 9,069,942; which is a National Phase filing of PCT International Application number PCT/IL2011/000907, filed on Nov. 29, 2011, published as International Publication number WO/2012/073233; which claims priority and benefit from U.S. provisional patent application No. 61/417,479, filed on Nov. 29, 2010; and all the above-mentioned patent applications are hereby incorporated by reference in their entirety.

FIELD

The present invention is related to the field of security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include devices, systems, and methods of detecting whether an electronic device or computerized device or computer, is being controlled by a legitimate human user, or by an automated cyber-attack unit or malware or automatic script. For example, the system monitors interactions performed via one or more input units of the electronic device. The system searches for abnormal input-user interactions; or for an abnormal discrepancy between: the input-unit gestures that were actually registered by the input unit, and the content that the electronic device reports as allegedly entered via such input units. A discrepancy or abnormality indicates that more-possibly a malware or automated script is controlling the electronic device, rather than a legitimate human user. Optionally, an input-output aberration or interference is injected, in order to check for manual corrective actions that only a human user, and not an automated script, is able to perform.

The present invention may provide other and/or additional benefits or advantages.

DETAILED DESCRIPTION OF THE PRESENT INVENTION

Figure 1:
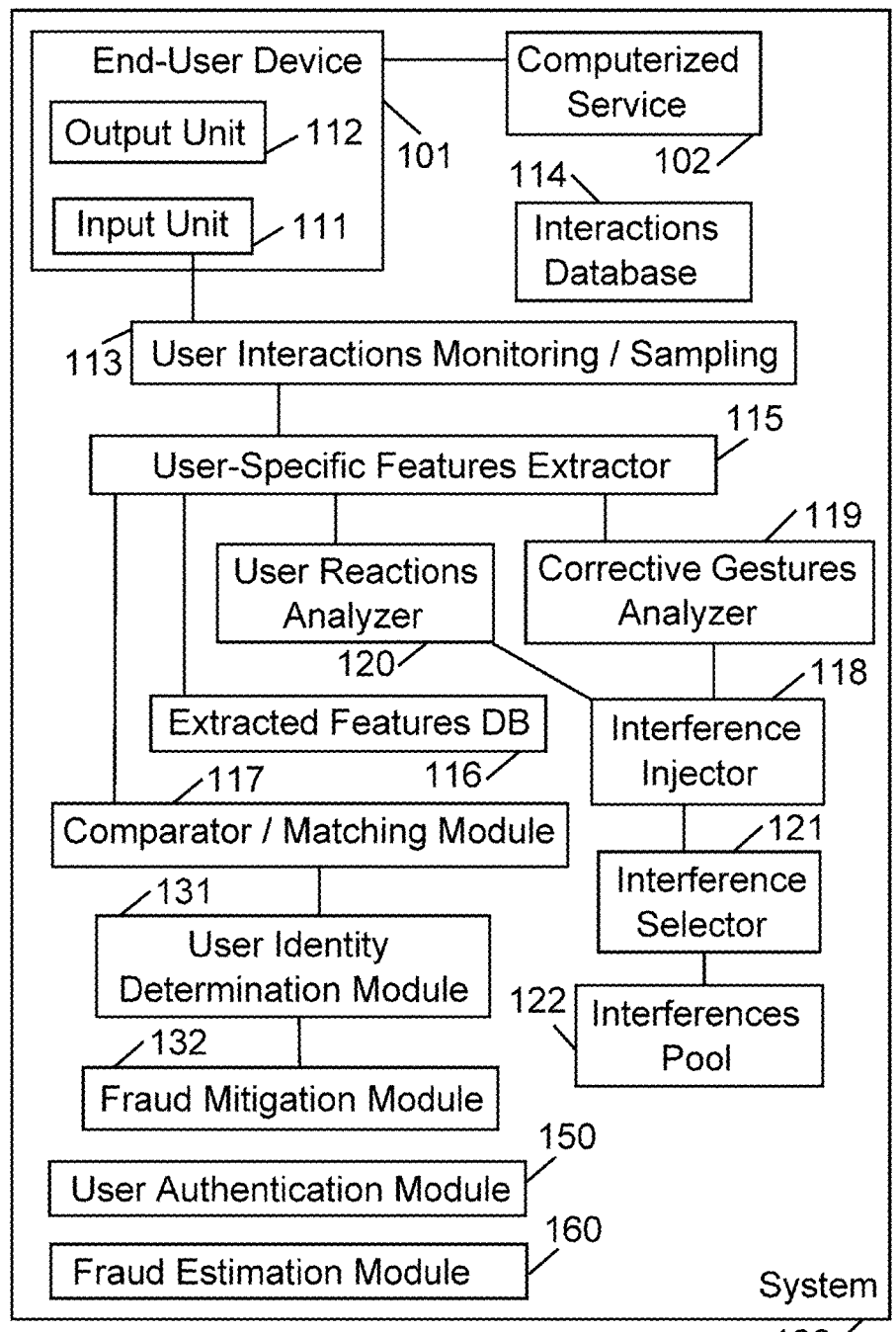
FIG. 1 is a schematic block-diagram illustration of a system, in accordance with some demonstrative embodiments of the present invention.

The present invention comprises systems, devices, and methods to enable detection (or determination, or estimation) of a "bot" or malicious automatic script or malware or a cyber-attack module or unit or computerized module, which is produces or generates or imitates human-like user-interaction data that resembles (or is posing as) human utilization of mouse, keyboard, touch-screen, touch-pad, or other input units of an electronic device or computing device or computer.

The Applicants have realized that it may be beneficial to construct and deploy a "bot" detector, or other malware detection module or unit that operates automatically and/or autonomously, in a generic manner (e.g., not necessarily searching for fingerprints of a particular already-known "bot" or specific already-known malware); and which is able to detect newly-devised "bots" or malware modules that are not yet known to security providers, and/or that were not yet analyzed by security research labs.

The Applicants have realized that in addition to a generic detection module(s), particular detection module(s) or unit(s) may be constructed and deployed in order to complement and/or fine-tune the detection process, and/or in order to reduce or eliminate the false-positive errors or the false-negative errors or other statistical errors of the generic detector module(s).

In some implementations, one or more "passive" methods may be utilized, to monitor or track user behavior and/or user interactions with a computerized service and/or with an electronic device; and to detect possible fraud or cyber-attack that involves a malware or a script or a "bot" that simulates or emulates keystrokes or mouse-movements or mouse-events or mouse-clicks or other input-unit-events (e.g., performed via a touch-pad, a touch-screen, or the like).

Such passive detection methods may comprise, for example: (a) detection of rapid "jumps" in mouse-pointer movement or on-screen-pointer movement (e.g., possibly deriving from an emulated mouse that is used by a malware module, which causes some of the mouse-pointer or on-screen-pointer movements to be non-smooth or non-continuous, or to include "gaps" or "jumps" or "on-screen jumps"); (b) detection of two mouse-clicks or two taps, that were performed at two different locations or on-screen locations, without detecting any (or sufficient) mouse-movement between them, or without detecting any (or sufficient) on-screen-pointer movement between them, which typically derives from emulated or simulated non-complete mouse operations; (c) abnormal or missing sequences of keyboard events, for example, keystrokes or typing that include only key-up event(s) and no key-down event(s), or vice versa, or non-identical numbers of key-up events compared to key-down events, or other discrepancy among keyboard-related events (key-down, key-up, key being held, key release) or their timing or their number or their sequence, which may indicate an emulated or simulated keyboard output, or may indicate that an automated script is trying to emulate or simulate (or is posing as) a human user; (d) detection of abnormal gaps or "jumps" among keyboard events; (e) detection of differences between the sampling rate of keyboard events and/or mouse events, or significant difference between their sampling rates, or abnormal changes in their sampling rate(s), possibly indicating that emulated or simulated output-data is generated (e.g., locally by a local attacker that immediately controls an adjacent co-located computing device; or remotely by a Remote Access attacker which may utilize a Remote Access Trojan (RAT) or other remote-access malware), rather than genuine local data produced locally by human interactions with actual input units; (f) detection of spoofing or modification or changing or replacement of data, at the User Interface level, derived from a malware module replacing or manipulating data that is being sent from the client-device to a remote server.

In some embodiments, the system may utilize a process that comprises passive detection method(s) and/or active detection method(s), to detect emulated or simulated or scripted "users" or bots or malware. Such process may comprise, for example: (a) detection of the form or field or page that is associated with the possible fraudulent operation or transaction, optionally by utilizing contextual mapping or contextual tagging or contextual analysis of UI elements or other content elements; (b) detection of submission of data by the end-user device even though no end-user input-unit activity is observed (or, even though a mismatching input-unit activity is observed); (c) detection of replacement of data or text, at the interface level (e.g., due to code injection); (d) detection of replacement of data or text, at the communication-layer level (e.g., by comparing the data that is captured by the security module added to a web-page or application, against the data that is actually received by the remote server of the target service).

Some implementations may detect advanced malware or "bots" or automated scripts that emulate or simulate user-interaction/input-unit data or signals. Optionally, the detection may take into account Contextual analysis of data, content, User Interface (UI) elements, forms, fields, and other page-components, in order to attribute a suitable risk-level to the interactions being tracked.

In some implementations, the system may inject or introduce or generate an input/output interference or an on-screen anomaly or abnormality or interference or irregularity, or other discrepancy between actions (e.g., gestures, movements, click-events, type-events, tilting, orienting, accelerating, or other operations) that the user actually performs via the input unit(s) and the reaction or feedback that is presented on the screen or that is otherwise exhibited by the electronic device; and the system may track whether corrective manual actions are performed via the input units. The introduction of the input/output interference or the on-screen interference or the input-unit interference, may enable the system to classify the user into a group of possible "bots" (or scripts, or malware), since such "bots" would not react to an on-screen interference that only a human observer may be able to see and/or react to; whereas most human users would see or would feel the discrepancy or abnormality and would perform corrective actions. This may enable the system to generate a High Risk Users List, which is a list of all the users that did not respond to the injected interference or abnormality, a list that would most probably include all the "bots" or malware modules that operated at that web-page or form or field or UI component, a list that may have a False Negative error rate of zero or near-zero. Accordingly, this may enable the system to identify "bots" or malware modules that are not aware yet of the system's fraud protection methods, and/or that are not pre-programmed to attempt to react to such injected abnormalities or interferences. Subsequently, passive fraud detection methods may be utilized (e.g., without injecting an interference), as part of the fine-tuning of the fraud detection process, to identify a particular malware of type-of-malware; and this, in turn, may allow a reduction or dilution of the above-mentioned High Risk Users List to remove from it human users and to dilute the list to include only malware modules, thereby achieving or attempting to achieve a False Positive error rate of zero or near-zero.

Some embodiments of the present invention may utilize automatic or automated or autonomous mapping of contextual properties of website components or webpage components (or application components, or User Interface (UI) components, or Graphical UI (GUI) components), for security purposes and/or for fraud-detection purposes and/or for fraud mitigation purposes and/or for risk assessment purposes.

The terms "webpage" or "web-page" as used herein may optionally comprise, for example, an entire website or Internet domain (e.g., www.Example.com); an entire sub-domain (e.g., Mobile.Example.com); a portion of a website, a portion of a domain, a portion of a sub-domain; a group or set or batch of inter-related web-pages; a group or set or batch of web-pages; a series of web-pages that are typically accessed from the same domain or that are hosted under the same domain, or that are co-hosted on the same server or a co-located server; a frame or a portion within a webpage; a content of web-page as displayed or presented via a web browser; the source code of a web-page; content of a web-page; an application or a mobile application or "app"; a page or form or tab that is part of a web-page or web-site or "app" or application; and/or other suitable structure.

The Applicants have realized that the interactions of a user with a computerized service (e.g., a website or an online service), may be monitored, logged and tracked in order to detect user-specific characteristics that may enable the system to differentiate among users, or that may enable the system to differentiate between a legitimate user (e.g., a genuine user who is the account-owner, an authorized user) and an attacker (or impersonator or "fraudster" or imposter or impostor or other illegitimate user).

The Applicants have further realized that the process of reaching a determination of fraud or non-fraud (or, the process of generating a fraud-possibility score or indicator), with regard to a particular transaction or operation, may comprise taking into account the Context of the operation or transaction being performed and/or the UI or GUI elements or the steps that are being utilized for performing the transaction.

For example, a user-behavior characteristic that indicates possible fraud, may not be sufficient to generate a fraud notification if the user is merely browsing the website and viewing the account balance; but he same or a similar user-specific behavioral characteristics may be sufficient for generating a fraud notification if the user engages in higher-risk or increased-risk or high-risk activity or operation (e.g., the user is submitting a command to wire funds from the logged-in account to a different account or to a third-party beneficiary).

Accordingly, the present invention may perform automatic scanning and mapping of the website (or webpage, or application, or service) that is being protected or being monitored or that is expected or intended to be monitored for fraudulent activity. The mapping process may identify UI elements or GUI elements (e.g., buttons, drop-down menus, selection boxes, data fields) and other elements (e.g., entire page or web-page; a tab or area in a website; a tab or area in a webpage; a tab or area in an application; an entire form; a sequence of operations or forms or pages), and may further classify or categorize or map such elements based on their context, based on their associated risk potential, or based on the level of damage that may occur if such element is fraudulently utilized, or based on the level of sufficiency of possible-fraud that would be required in order to trigger a fraud notification.

In some implementations, an automatic or semi-automatic Contextual Mapping Module may examine elements, forms, pages, fields, UI elements, GUI elements, text items, images, animations, video segments, audio segments, and/or other components of a website or webpage or application or service that is being protected against fraud (or that the system is preparing towards fraud protection). The Contextual Mapping Module may automatically identify and/or classify such elements as high-risk elements, low-risk elements, and/or other suitable risk-related classifications (e.g., medium-risk elements, risk-natural elements, no-risk elements, unknown-risk-level elements, increased risk-level elements, reduced risk-level elements).

The contextual mapping information of such elements may be stored in a lookup table or database or other data-structure, or as a fraud risk-level parameter associated with each element; and may subsequently be utilized as a factor or a parameter in the process of determining whether or not an operation or a transaction (or a set of operations) is fraudulent or legitimate, or in the process of assigning or generating a total fraud-possibility score for a transaction or for on operation or set of operations.

In a demonstrative implementation, the Contextual Mapping Module may identify or may isolate UI elements (e.g., a "submit" button, or a free-text field); and may assign a risk-level or a security-importance level or a security-exposure level associated with each such element. For example, the Contextual Mapping Module may detect a "submit wire transfer command" button on a "submit wire transfer" page or form or tab, and may assign High Risk indicator to that UI element and/or to UI elements that are located on the same page, and/or to user-operations that would be performed by utilizing that UI element or in relation to the page (or form) in which the UI element is located.

In contrast, the Contextual Mapping Module may detect a more "benign" UI element or form or page or website-element, such as a "Show Frequently Asked Questions (FAQ)" link or button, or a "Find Branch Location" button or link or form, that are generally associated with reduced risk or reduced exposure (or, no security risk, or no security exposer), and may tag or map them accordingly as reduced-risk or low-risk elements or pages or forms.

In some embodiments, the Contextual Mapping Module may tag or map or assign exposure values or fraud-relatedness values to such elements in an automatic or semi-automatic manner, and not manually and not by depending on manual (human) review of each element. For example, the Contextual Mapping Module may take into account certain keywords or words or terms in order to classify or tag such UI elements, and may compare the text or content of such UI elements to a pre-defined list of high-risk terms and/or to a pre-defined list of low-risk terms. For example, "wire" or "transfer" or "wire funds" or "wire transfer" may trigger higher-risk tagging; whereas "Contact Us" or "F.A.Q." or "Branch Locations" may trigger lower-risk tagging; a form that mention "please re-enter your password for additional security" may trigger higher-risk tagging; or the like.

In some embodiments, the Contextual Mapping Module may utilize a multi-step process, that may include, for example: (a) analysis of information and prior contextual mapping and prior contextual tagging, that had already been performed (e.g., manually, by human operators, or by automatic means) to elements or forms or contents of previously-mapped websites in general or to previously-mapped websites in a particular field (e.g., banking websites; online retailers; brokerage websites); (b) characterization of the methodology of automatic contextual mapping or automatic contextual tagging, that would cover or capture correctly the already-tagged or already-mapped elements from other websites or other web-pages; (c) implementation and deployment of machine-readable instructions or code, that reflects automatic process or automatic logic for carrying out the identified methodology; (d) experimental running or execution of the code on a newly-examined website that has not been part of the sample of websites (or web-pages) that were utilized in step (a) above; and (e) examining the results of the experimental run cycles, evaluation of the automatic mapping results, and fine-tuning and modification of the code to improve the process of contextual-based mapping or tagging.

Reference is made to FIG. 1, which is a schematic block-diagram illustration of a system 100 in accordance with some demonstrative embodiments of the present invention. The components of system 100 may be implemented by using suitable hardware units and/or software units; and may be co-located within a single computer device or a single computing system, or may be scattered or distributed across two or more computing devices and/or computing systems. In some embodiments, client-server architecture may be used; such that some of the components and units may be implemented locally at the end-user device, whereas other components and units may be implemented remotely or by using a remote server or a "cloud computing" server or repository or computer. In some embodiments, some modules and functionality may be implemented by utilizing a web-browser, a plug-in or extension or add-on to a web-browser or to an Operating System (OS), by using a native application or a mobile-web application, by using JavaScript and/or CSS and/or HTML5, and/or by using other suitable technologies. Components of system 100 may interact or communicate over one or more wireless communication links, wired communication links, cellular communication, client/server communication, peer-to-peer communication, or the like.

System 100 may enable an end-user device 101 to interact with a computerized service 102. The end-user device 101 may be, for example, a smartphone, a tablet, a laptop computer, a fitness bracelet (e.g., similar to FitBit or Jaw-Bone wearable devices), a wearable device, a portable device, an Augmented Reality (AR) device or glasses or helmet or headgear (e.g., similar to Google Glass), a Virtual Reality (VR) device or glasses or helmet or headgear (e.g., similar to Oculus Rift), or the like. In some embodiments, the end-use device 101 may be a stand-alone machine or interface; a digital kiosk or kiosk-type machine, a vending machine, an Automated Teller Machine (ATM), a point-of-sale (POS) terminal or machine, or the like. In some embodiments, the end-user device 101 may be a point-of-entry terminal, or a user-identification terminal, such as a terminal or scanner or dashboard or touch-screen which may be used for secure physical entry or entrance or passage through a gate or door or lobby or turnstiles or room or corridor, or as part of (or replacement of) a physical entry monitoring system. In yet other embodiments, the end-user device 101 may be or may comprise, or may be comprised in, a vehicle, a vehicular device, a dashboard, a vehicular dashboard, a vehicular computing system, a vehicular computing device, a vehicular ignition unit or system, a vehicular component that is operable in conjunction with a vehicular ignition system, a vehicular immobilizer unit, a vehicular component that is operable in conjunction with a vehicular immobilizer unit, or the like.

The computerized service 102 may be a local and/or a remote computerized platform or service or application or web-site or web-page. The computerized service may be installed locally and entirely on the end-user device 101; or may be installed remotely and entirely on a remote server or a remote computer which is then accessed by the end-user device 101 either via one or more wired and/or wireless communication link(s); or may be a hybrid implementation which utilizes one or more remote components (e.g., a remote Application Server) and one or more local components (e.g., a local native application; a local mobile-web application; a local web-browser).

Some demonstrative and non-limiting examples, of suitable computerizes service(s) which may be used in conjunction with the present invention, may include: banking service, online banking services, retail banking services (e.g., performed within or at an ATM or a branch of a bank); brokerage or online brokerage services; usage and/or access to electronic mail, email, SMS accounts, instant messaging (IM) accounts and services, social networks; an enterprise network or corporate network or organizational network which is available only to employees or authorized users of an organization or enterprise; a members-only network or service, or a paying-members-only service or network, or a premium service, which are available only to certain users and/or to members and/or to paying users; applications and/or websites and/or services that enable or perform payment, electronic payment, utilization of credit card and/or debit card and/or wire transfer and/or electronic funds transfer; applications that access or utilize a secure database storing confidential or non-public information; and/or any suitable electronic service which may be accessed locally and/or remotely by end-user device 101.

In some embodiments, the computerized service 102 need not be external to the end-user device 101, and may be entirely internal to the end-user device 101, or may be the end-user device 101, or may be a particular functionality or a general functionality of the end-user device 101. For example, the end-user device may be a smartphone or tablet; and the computerized service 102 may be one or more features or functionalities or applications of that smartphone or tablets. In some embodiments, the present invention may be used as part of a locking or unlocking mechanism of a smartphone or tablet or other end-user device 101; or as part of a process in which a user unlocks or "wakes up" a hibernating device, or takes the device from reduced-power mode (or from "sleep mode") to fully-operational mode.

End-user device comprises an input unit 111, for example, mouse, keyboard, stylus, touch-screen, multi-touch-screen, trackball, joystick, or the like. End-user device further comprises an output unit 112, for example, monitor, screen, touch-screen, multi-touch-screen, or the like. In some embodiments, the input unit and the output unit may be implemented as the same single unit, for example, as a touch-screen or multi-touch screen.

A user interactions monitoring/sampling module 113 may monitor some or all of the user interactions and/or user gestures; and may record, capture, or otherwise sample such interactions and/or gestures. Optionally, an interactions database 114 may log and/or may store data reflecting the monitored user interactions, for a single user or for multiple users.

User-specific features extractor 115 may extract or estimate user-specific features or traits or characteristics or attributes, that characterize an interaction (or a set or batch or group or flow of interactions, or a session of interactions) of a user with the computerized service 102. Optionally, an extracted features database 116 may store data or records which reflects users and their respective values of extracted (or estimated) user-specific features.

Optionally, a comparator/matching module 117 may compare or match, between (or among): (a) values of user-specific features that are extracted in a current user session (or user interaction), and (b) values of respective previously-captured or previously-extracted user-specific features (of the current user, and/or of other users, and/or of pre-defined sets of values that correspond to known automated scripts or "bots" or known attackers).

The user-specific features, whose values may be compared or matched across usage-sessions, may include, for example, curvature (or curvature radius) of mouse movement or mouse strokes; acceleration and/or speed of mouse movement in one or more directions; smoothness of movement; velocity or speed of gestures; acceleration or deceleration of gestures; rate or frequency of mouse clicks; accuracy or inaccuracy of gestures or clicks, or their relative location (e.g., whether the user typically clicks correctly an on-screen button, or sometimes misses the button and clicks nearby); the particular type of manner that the user chose to convey input (e.g., whether the user clicked on "submit" button, or pressed the "enter" key; or, whether the use moved between form fields by using the "tab" key or by using the mouse cursor); particular sequences of keys or characters that the user enters more rapidly (or more slowly) relative to other characters or sequences; particular manner or pattern in which the user navigates within fields or within a page or an application; and/or other suitable features, for example: device movements or input-unit movement during interaction, movement and/or orientation and/or acceleration of the entire device (e.g., a smartphone or tablet) during the interaction, whether one single finger or multiple particular fingers are used for interacting, the relations between fingers while interacting, the relation to other body parts while interacting, and/or other suitable gesture parameters. Optionally a deep learning algorithm and/or a machine learning algorithm or other suitable Artificial Intelligence (A.I.) algorithm may be utilized, in order to learn and to define a user-specific profile based on the data that is monitored or produced during the interaction (and optionally, immediately prior to the interaction and/or immediately after the interaction); optionally, without necessarily using any specific pre-define features or characteristics or features, and optionally using a heuristic approach or holistic approach or "fuzzy logic" algorithm that attempts to find a unique identifier or a unique digital footprint without necessarily being tied to a specific biometric parameter or to a set of pre-defined biometric parameters. Some embodiments may thus generate a user-specific biometric profile or biometric signature, without pre-defining a set of biometric characteristics or parameters that are then used to calculate the signature or profile; but rather, by utilizing deep learning which utilizes mathematical generation of a unique profile or signature without necessarily defining or pre-defining the set of physical parameters that would be used for differentiating among users.

Optionally, an interference injector 118 may operate to introduce, add, inject, generate and/or otherwise cause an interference (or anomaly, or aberration, or inconsistency, or deviation, or input-output interference, or input/output anomaly) to the input and/or the output as they are reflected to the user who utilizes the end-user device. Such intentionally-introduced input/output interference may be, for example: temporarily hiding or removing the on-screen mouse-pointer or on-screen pointer, in order to elicit the user to react and to make gestures in an attempt to revive the hidden on-screen pointer; intentional deviations or "jumps" in the movement of the on-screen pointer, relative to the actual manual gesture that is performed by the human user (e.g., the human user drags the mouse eastbound, but the on-screen pointer deviates and moves north-east, thereby eliciting a corrective movement or corrective gestures by the user); intentionally moving or re-locating an on-screen interface component (e.g., a "submit" button or a "next" button) while the user is dragging an on-screen pointer; and/or other suitable interferences or anomalies, whose goal is to elicit the user to react and/or to perform corrective steps or corrective gestures; thereby enabling the user-specific features extractor 115 to further extract user-specific attributes or features that characterizes such corrective gestures or such reactions to anomalies; e.g., the time period that it takes the user to notice the anomaly and/or to correct it; the manner in which the user corrects the anomaly (e.g., whether the user tries to locate a disappeared on-screen pointer, by shaking his mouse, or by moving the mouse sideways, or by moving the mouse clockwise, or by moving the mouse counter-clockwise, or by clicking the mouse-button once, or by clicking the mouse-button multiple times, or by typing on the keyboard.

In some embodiments, a corrective gestures analyzer unit 119 may monitor, track, analyze and/or characterize such corrective actions or gestures of the user in response to such interference or anomaly or aberration. In some embodiments, a user reaction analyzer unit 120 may monitor, track, analyze and/or characterize such gestures or reactions of the user in response to such interference (which may not necessarily involve a corrective action). In some embodiments, these functionalities, of the corrective gestures analyzer unit 119 and/or the user reaction analyzer unit 120 may be part of the functionality of the user-specific features extractor 115.

It is noted that in some embodiments, interferences may be injected or used continuously; or may be used only in particular portions or regions of the computerized service (e.g., only on certain pages of a website, or only when certain functionalities of the application are requested, such as high-risk or higher-risk functions); or may be injected pseudo-randomly, or at pre-defined time intervals; or may be injected if one or more other conditions are true (e.g., if there are other indicators of fraudulent activity or irregular activity); or may not be injected at all, for a particular user or for a particular usage-session, or for all users or for a group of users. In some embodiments, optionally, an interference selector module 121 may select or may determine, based on one or more criteria or conditions, whether or not to introduce an interference, or whether (or when exactly, or where exactly) to trigger or to command the interference generator 118 to generate an interference; optionally by selecting a suitable interference from a pre-defined interferences pool 122. For example, the interference selection may be based on user characteristics, and/or based on attributes of the computerized service, and/or based on pseudo-random selection; or by selecting interferences of a type that was not yet used for a particular user, or conversely by selecting interferences of a type that had been already used for a particular user, or by taking into account the level of risk associated with a user-requested functionality of the computerizes service, or the like. The injection of interferences, and/or the analysis of user reactions to interference, and/or the analysis of corrective gestures, may be optional.

If the comparator/matching module 117 determines that one or more features, or a set of features, that characterize the current interaction session of the current user, does not match those features as extracted in previous interaction session(s) of that user, then, a possible-fraud signal may be generated or sent or transmitted to other units of system 100 and/or to pre-defined recipients.

For example, combined factors and data may be taken into account by a user identity determination module 131, which may determine or estimate whether or not the current user is a "fraudster" or an attacker or an imposter. The user identity determination module 131 may trigger or activate a fraud mitigation module 132 able to perform one or more fraud mitigating steps based on that determination or estimation; for example, by requiring the current user to respond to a challenge, to answer security question(s), to contact customer service by phone, to perform two-step authentication or two-factor authentication, or the like.

System 100 may comprise a user authentication module 150 which may enable system 100 and/or computerized service 102 and/or end-user device 101 to perform user authentication, or to authenticate or verify or confirm the identity of a user of end-user device 101 (or of computerized service 102), and/or to utilize the unique behavior and/or gestures and/or reactions of the user as a user-identifying feature (e.g., which may be used by the system to authorize a log-in, or may authorize access, or may authorize a password recovery or a password reset process). The user authentication module 150 may be able to distinguish between (i) a legitimate user, or genuine user, or authorized user, or genuine account-owner; and (ii) an illegitimate user or attacker or cyber-attacker or impostor or imposter, a human attacker, a non-human attacker (e.g., a malware or automatic script or automated script or "bot") or other illegitimate user.

In some demonstrative embodiments of the present invention, system 100 may comprise a fraud estimation module 160, able to estimate or detect or determine a fraud or a fraudulent transaction or a fraudulent user or an attacker or a fraudulent set-of-operations, or an attempted fraud or an attempted fraudulent transaction (which may be concurrently occurring, or which had already occurred and is now detected or estimated in retrospective review of previous operations or prior data).

System 100 may further comprise a Bot/Malware/Script Identifier 170, able to estimate or detect or determine that an electronic device or computer, or computing device, or a computerized service, is being controlled (or, is being attempted to be controlled, or attacked, or accessed, or utilized) by a "Bot" or malware or automated script or other automatic cyber-attack unit or module, rather than by a legitimate human user (or, rather than by a human user).

System 100 may further comprise one or more of the other modules, units and/or components that are described herein.

Figure 2:
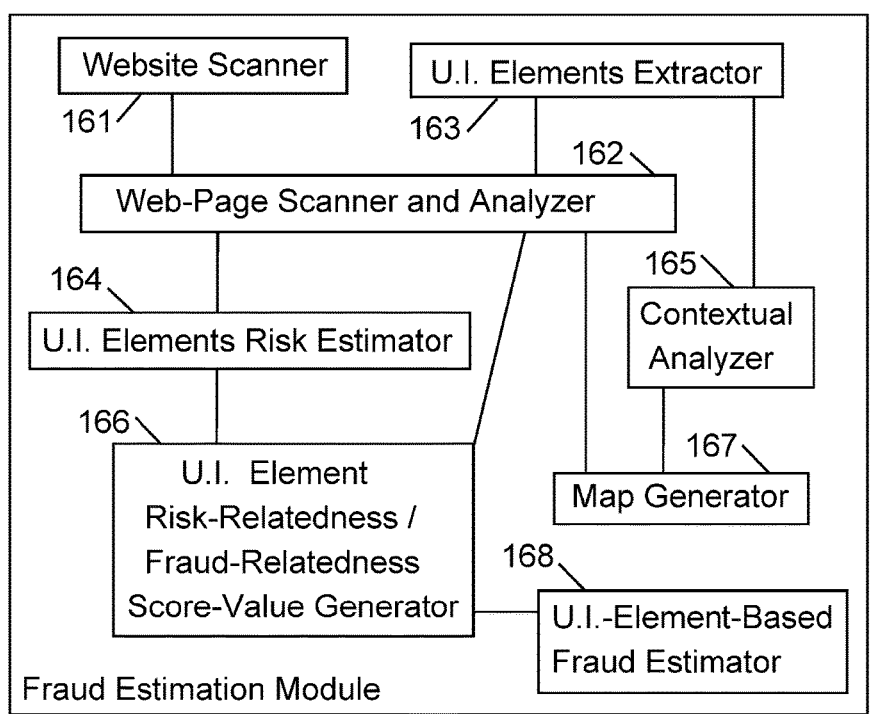
FIG. 2 is a schematic block-diagram illustration of a fraud estimation module, in accordance with some demonstrative embodiments of the present invention.

Reference is made to FIG. 2, which is a schematic block-diagram illustration of fraud estimation module 160 and its associated components, in accordance with some demonstrative embodiments of the present invention.

In accordance with some demonstrative embodiments of the present invention, fraud estimation module 160 may comprise a website scanner 161, able to scan or search or crawl or download or otherwise obtain, download and/or review an entire website (e.g., a banking website, an electronic commerce site), and able to obtain or download some or all of the web-pages of such website, or able to generate such web-pages from a dynamic script or from a source code of such website. For example, the website may be a banking website; and the website scanner 161 may crawl the entire banking website (or selected portions of the banking website), and may generate or may download a set of web-pages for further analysis. For example, the website scanner 161 may scan a banking website; and may download or generate multiple web-pages therefrom, such as, a first web-page that is used for "Contact Us", a second web-page that is used for "Find Branch Location", a third web-page that is used for "Perform Wire Transfers", a fourth web-page that is used for "See Account Details", a fifth web-page that is used for "Frequently Asked Questions", or the like.

In some embodiments of the present invention, a web-page scanner and analyzer 162 may then scan and analyze the content, data, meta-data, UI elements, GUI elements, input/output elements, links, hyperlinks, buttons, source code, and/or any other suitable data or data-items of each such web-page.

For example, a UI Elements Extractor 163 may operate in conjunction with (or as part of) the web-page scanner and analyzer 162, and may extract or identify each UI element of the web-page being analyzed; and may generate a list or a lookup table or database or other data-structure of the identified UI elements. For example, the UI Elements Extractor 163 may analyze the web-page of "Find Branch Location"; may identify each field that the user may be able to fill-out (e.g., city, zip-code), may identify each drop-down menu or radio-button or other selectable UI element (e.g., for selecting radius around a zip-code), and/or may identify any other UI elements (e.g., a "submit" or "search" button or link). Similarly, the UI Elements Extractor 163 may analyze a "Perform Wire Transfers" page; may identify a first field of "Beneficiary Name", may identify a second field of "Beneficiary Account Number", may identify a third field of "Amount to Transfer", may identify a fourth UI element of "Submit" (e.g., button for submitting the filled-out online form), or the like.

In accordance with some demonstrative embodiments of the present invention, a UI Elements Risk Estimator 164 may estimate or determine a risk or an exposure that may be associated with each one of the identified UI elements on the web-page. Optionally, a contextual analyzer 165 or other suitable module may be utilized, for example, to perform contextual analysis, semantic analysis, content-based analysis, or other suitable analysis operations; optionally utilizing a Natural Language Processing (NLP) algorithm for analyzing the content or label that is associated with (or contained in) each such UI element; and/or optionally using a comparison or a search that utilizes pre-defined keywords or triggering words or terms. Optionally, one or more databases may be utilized or searched; for example, a database may be constructed by analyzing a log of fraudulent transactions and identifying the web-page portions or components or UI elements that fraudulent users (or attackers) typically utilize or typically engage (e.g., a "Make Payment Now" button), and conversely identifying web-page components or UI elements that fraudulent users (or attackers) typically does not utilize during a fraudulent transaction or during an attack (e.g., a "Contact Us" button, or a "Branch Locator" link); and optionally, identifying web-page elements or UI elements that are "neutral", and that are sometimes used by fraudulent users as well as by legitimate users (e.g., "Show Current Account Balance" button or link). Such database(s) may be constructed by analyzing historical, known, attacks or fraudulent transactions; and may be searched, or compared to, in order to determine whether a UI element of a current web-page is fraud-related or non-fraud-related in its typical engagement.

In some embodiments of the present invention, for example, the contextual analyzer 165 may compare a label or a content of a UI element, to a first pre-defined list of high-exposure (or high-risk) terms and/or to a second pre-defined list of low-exposure (or low-risk) terms. In a demonstrative example, the first pre-defined list of high-risk terms may include, for example: "Transfer Money", "Move Funds", "Wire Transfer", "Submit Payment"; and in contrast, the second pre-defined list of low-risk terms may include, for example: "Contact Us", "Branch Locator", "Terms of Use", "Frequently Asked Questions". Optionally, a third medium-risk or medium-exposure list of terms may be used, including terms or words or keywords which are not necessarily associated with high-risk operations, but are also not entirely benign and are not entirely low-risk; such as, for example, "Show Account Balance", "Show Recent Transactions", "Show Monthly Statement".

In accordance with some embodiments of the present invention, based on the contextual analysis performed by the contextual analyzer 165, and/or based on other analysis performed by the UI Elements Risk Estimator 164 and/or by taking into account other conditions and/or other analysis results, a UI Element Risk-Relatedness/Fraud-Relatedness Score-Value Generator 166 may generate or assign or allocate a score-value to each UI element on the web-page, indicating the risk-relatedness or the fraud-relatedness or the security-exposure that is associated with user engagement of such UI element. In a demonstrative example, each list of pre-defined terms or keywords, may further include, for each term or keyword, an associated risk-value or exposure-value, which may be used if identified in the UI element or if otherwise identified as being associated with the UI element.

In a demonstrative example, risk-value or fraud-relatedness may be a number or a value in the range of 0 to 100, wherein 0 indicates "no risk/no exposure", and wherein 100 indicates "maximum risk/maximum exposure". For example, a UI element that is identified as including (or as being associated with, or as triggering) a "Contact Us" operation or page or action, may be assigned a fraud-relatedness value or a risk-value of zero or near-zero, or a very low (e.g., single-digit) score value. Similarly, a UI element that corresponds to "Branch Locator" or to "Frequently Asked Questions", may be assigned a zero or near-zero (or single-digit) risk-value or fraud-relatedness value. In contrast, a field of "Enter the Beneficiary Account Number for Wire Transfer", or a button of "Do the Wire Transfer Now", may be associated with a high risk-value or fraud-relatedness value (e.g., value of 90 or 95, out of 100). In between, medium-exposure UI elements, such as "Show Account Balance" or "Show Monthly Statement", may be assigned a medium risk-value or fraud-relatedness (e.g., value of 50 or 55, out of 100). Other suitable values and/or ranges may be used.

In some demonstrative embodiments of the present invention, a Map Generator 167 may generate a representation or a data-structure, such as a map, a "heat map", a lookup table, a list, a spreadsheet, a database, or other suitable data structure, to indicate the extracted UI elements in a web-page, and the risk-value or fraud-relatedness value of each one of the UI elements. For example, Table 1 demonstrates such a lookup table of UI elements of a particular single page in a banking website:

TABLE 1

| UI Element | Risk Relatedness or Fraud Relatedness |
| --- | --- |
| "Contact Us" button or link | 4 |
| "Branch Locator" button or link | 2 |
| "F.A.Q." button or link | 1 |
| "Show Account Balance" button or link | 49 |
| "Show Monthly Statement" button or link | 47 |
| "Perform Payment to Payee" button or link | 51 |
| "Define New Payee" button or link | 90 |
| "Perform Money Transfer" button or link | 89 |
| "Beneficiary Name" field | 92 |
| "Beneficiary Account Number" field | 87 |
| "Amount to Wire" field | 85 |
| "Send Email Confirmation" yes/no selector | 88 |
| "Submit Payment Now" button | 96 |
| "Wire the Funds Now" button | 98 |

In accordance with the present invention, a UI-Element-Based Fraud Estimator 168 may operate, in real-time as a user engages with the web-page or with UI elements, and/or in retrospect or retroactively (e.g., by reviewing and analyzing a log of previously-recorded user interactions), in order to estimate whether a particular user operation, or a set of operations, is estimated to be fraudulent, or is estimated to be associated with fraudulent behavior, or is estimated to be associated with a fraudulent user. The UI-Element-Based Fraud Estimator 168 may take into account a combination of: (i) the risk-value or fraud-relatedness value of the UI element that was engaged, and (ii) the user-specific behavioral characteristic(s) that were extracted from user interactions performed in conjunction with (or as part of) engaging that particular UI element, and/or immediately prior to engaging with that UI element (e.g., as the on-screen pointer is moved from a previous, source position, to the UI element being engaged), and/or immediately after engaging with that UI element (e.g., as the on-screen pointer is moved from that UI element to another on-screen destination). Optionally, the UI-Element-Based Fraud Estimator 168 may further take into account, for example, the user's reaction or response or remedial actions or corrective actions, that were performed (if at all performed) in reaction to an injected input-output aberration or interference or irregularity or abnormality.

In a demonstrative example, the UI-Element-Based Fraud Estimator 168 may detect that a highly-suspicious behavior has been identified in conjunction with engaging with the "Branch Locator" button; such as, that the on-screen mouse-pointer, when moving towards the "Branch Locator" button, appears to "jump" (e.g., indicating a possible Remote Access user, rather than a direct user that sits in front of a computing device), or that the mouse-pointer moves in an entirely perfect straight line (e.g., typically associated with an automatic script that moves the mouse-pointer, and not with a human user that rarely performs perfectly-linear moves). However, even though the user behavior was suspicious and appears to be fraudulent, the particular UI Element that was the subject of the user engagement is a Low Risk UI element, associated with a low (e.g., single digit) risk-value or fraud-relatedness value. Therefore, the UI-Element-Based Fraud Estimator 168 may determine that there does not exist a need to trigger a fraud alert yet.

In contrast, the UI-Element-Based Fraud Estimator 168 may detect that a partially-suspicious behavior has been identified in conjunction with engaging with the "Submit Wire Transfer Now" button; such as, that the on-screen mouse-pointer, when moving towards the "Submit Wire Transfer Now" button, appears to "jump" (e.g., indicating a possible Remote Access user, rather than a direct user that sits in front of a computing device), or that the mouse-pointer moves in an entirely perfect straight line (e.g., typically associated with an automatic script that moves the mouse-pointer, and not with a human user that rarely performs perfectly-linear moves). Accordingly, since the user behavior was suspicious or partially-suspicious, and since the subject of the user engagement is a High Risk UI element, associated with a high risk-value or high fraud-relatedness value, then the UI-Element-Based Fraud Estimator 168 may determine that there exist an immediate need to trigger a fraud alert.

In some embodiments, the fraud estimation module 160 may generate as output a binary-type determination, indicating that a particular operation, or a particular set-of-operation, or a particular transaction, or a particular engagement with one or more UI elements, is either: (I) legitimate, or (ii) fraudulent. In other embodiments, the fraud estimation module 160 may generate as output a ternary-type determination, indicating that a particular operation, or a particular set-of-operation, or a particular transaction, or a particular engagement with one or more UI elements, is either: (I) legitimate, or (ii) fraudulent, or (III) that the system does not have sufficient data in order to positively select option (I) or option (II). In still other embodiments, the fraud estimation module 160 may generate as output a fraud-probability score, indicating the estimated probability (e.g., on a scale of 0 to 100, or other suitable range of values) that a particular operation, or a particular set-of-operation, or a particular transaction, or a particular engagement with one or more UI elements, is fraudulent (or, is associated with a fraudulent transaction, or with fraudulent purposes, or with a fraudulent user). Other types of outputs or determinations or scores may be generated by the systems and methods of the present invention.

Figure 3:
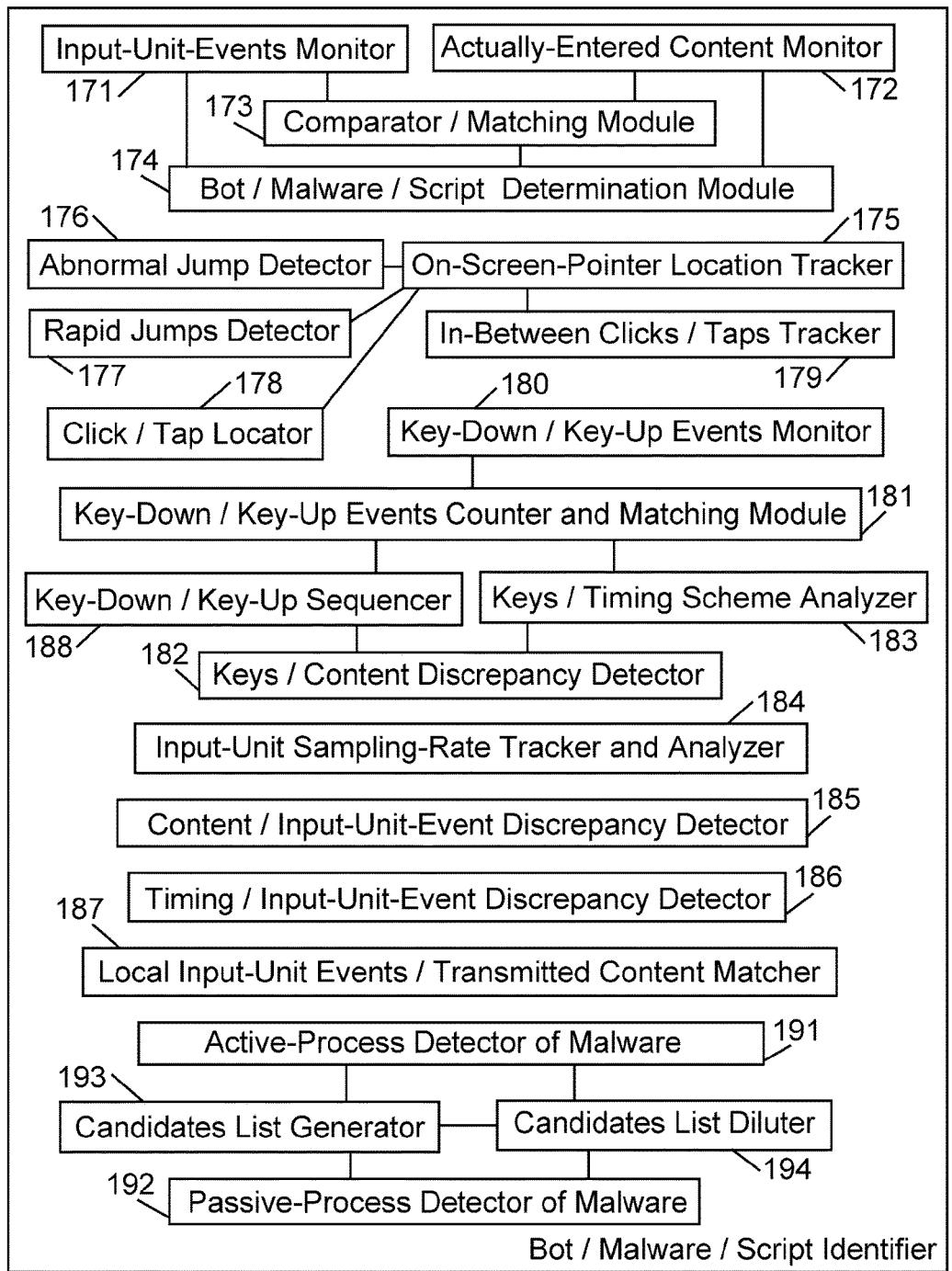
FIG. 3 is a schematic block-diagram illustration of Bot/Malware/Script Identifier and its associated components, in accordance with some demonstrative embodiments of the present invention.

Reference is made to FIG. 3, which is a schematic block-diagram illustration of Bot/Malware/Script Identifier 170 and its associated components, in accordance with some demonstrative embodiments of the present invention.

In some embodiments, for example, the Bot/Malware/ Script Identifier 170 and/or its associated components may perform a method comprising: (a) monitoring input-unit events of one or more input units of an electronic device, by an Input-Unit-Events Monitor 171; (b) monitoring actual content that said electronic device receives as actual input, by an Actually-Entered Content Monitor 172; (c) detecting a mismatch between (i) the input-unit events of said electronic device, and (ii) the actual content that said electronic device received as actual input; the mismatch may be detected by a suitable Comparator/Matching Module 173; (d) based on the detecting of step (c), determining that said electronic device is more-probably (or, most-probably; or absolutely, or certainly, or necessarily) controlled by an automated attacking module, and not by a legitimate human user, such detection being performed by a Bot/Malware/ Script determination module 174. For example, the system may search for discrepancy or mismatch, between the number and/or the type(s) and/or the order(s) and/or the sequences(s) of input-unit events that were registered by the input-unit(s), and the actually-entered content (e.g., strings, data, field data, form data) that the electronic device reports or registers or transmits as allegedly corresponding to manually-entered input.

Optionally, the Bot/Malware/Script determination module 174 may comprise, or may utilize or may be associated with, a Statistical Analysis Unit which may perform statistical analysis of data of input-unit(s) interactions; for example, calculating average, mean, standard deviation, variance, distribution, distribution pattern(s), and/or other statistical properties of the registered or reported input-unit(s) events or gestures or data; and then, comparing them or matching them to general-population statistical properties of human-users utilization of such input-units, in order to find a mismatch or a significant deviation from human-characterizing statistical properties of human behavior. For example, determining that the keyboard exhibited an average (or median) typing speed of 650 words-per-minute, within one usage session or over multiple usage-sessions of the same user, indicates that this is non-human characteristic (e.g., as human can type at a speed of up to around 200 words-per-minute), thereby indicating that a computerized script more-probably (or, most-probably; or absolutely, or certainly, or necessarily) than a human-user was responsible for entering such keyboard data. Similarly, statistical distribution of input-unit data or metadata (e.g., time-gaps between key-down/key-up events, time-gaps between typed characters, time-gaps between mouse-clicks or on-screen taps, or the like) may similarly be used for detecting non-human behavior of an automated, impostor, script or "bot". The statistical analysis may comprise, for example, comparison to threshold values; comparison to pre-defined maximum threshold value; comparison to pre-defined minimum threshold value; finding a different from threshold value(s) (e.g., determining that a statistical property that was calculated, is at least 20% less or is at least 20% more than a human-based value of such property); checking whether the calculated statistical property is within a pre-defined range of acceptable human-based values; or the like. Similarly, the Bot/Malware/Script determination module 174 may search for, and may detect, other types of abnormal behavior that does not (or cannot) characterize human utilization of an input-unit; for example, occurrence of two (or more) mouse-clicks or touchpad-taps or touch-screen taps, simultaneously or concurrently, at two (or more) different locations or on-screen locations; thereby indicating an automated "bot" or script, and not a human user.

In some embodiments, for example, the Bot/Malware/ Script Identifier 170 and/or its associated components may perform: (A) by using an On-Screen-Pointer Location Tracker 175, monitoring and tracking location over time, of an on-screen pointer of said electronic device; (B) by using an Abnormal Jump Detector 176, detecting an abnormal jump of said on-screen pointer, from a first on-screen location, to a second non-adjacent screen location; (C) by using the Bot/Malware/Script determination module 174, based on detection of said abnormal jump of said on-screen-pointer, determining that said electronic device is more-probably (or, most-probably; or absolutely, or certainly, or necessarily) controlled by an automated attacking module, and not by a legitimate human user. For example, the system may detect that an on-screen pointer has "jumped" from a first on-screen point or location, to a second, non-adjacent or non-consecutive, point or location (e.g., from screen location (10, 20) to screen location of (280, 310), or the like). Such abnormal jump may be detected, although a human user utilizes a mouse or touch-pad or touch-screen in a generally-continuous movement or motion or strokes; and this may indicate that a malware or automated script or "bot" has operated the device or the computerized service, rather than a human user.

In some embodiments, for example, the Bot/Malware/ Script Identifier 170 and/or its associated components may perform: (A) monitoring location over time, of an on-screen pointer of said electronic device; (B) detecting an abnormal jump of said on-screen pointer, from a first on-screen location, to a second non-adjacent screen location; and further detecting that said abnormal jump does not match input-unit events of said electronic device; (C) based on detection of said abnormal jump of said on-screen-pointer, determining that said electronic device is more-probably (or, most-probably; or absolutely, or certainly, or necessarily) controlled by an automated attacking module, and not by a legitimate human user. In some embodiments, the detection of an abnormal (e.g., non-adjacent) jump of the on-screen pointer, by itself, may suffice in order to generate an alert of possible-fraud; in other embodiments, such detection may trigger an alert if additional condition(s) hold true, such as, for example, if such "jump" of the on-screen pointer was not concurrently accompanied by any input-unit events, or was not accompanied by sufficient input-unit events that may indicate a human-user basis for such on-screen pointer displacement.

In some embodiments, for example, the Bot/Malware/ Script Identifier 170 and/or its associated components may perform: (A) by using a Rapid Jumps Detector 177, detecting that an on-screen pointer of said electronic device exhibits rapid jumps among two or more on-screen locations, wherein said rapid jumps comprise two or more jumps that occur within a pre-defined time period; (B) based on detection of rapid jumps of said on-screen pointer, determining that said electronic device is more-probably (or, most-probably; or absolutely, or certainly, or necessarily) controlled by an automated attacking module, and not by a legitimate human user. For example, the system may detect that one or more jumps, or two or more jumps, have occurred with regard to the on-screen pointer, within a pre-defined period of time (e.g., 1 second, 5 seconds, 30 seconds, K seconds); and this may base a determination of possible-fraud.

In some embodiments, detection of a single, isolated, "jump" or abnormal displacement of the on-screen pointer, suffices in order for the system to determine that possible-fraud is exhibited. In other embodiments, detection of a single, isolated, "jump" or abnormal displacement of the on-screen pointer, does not suffice in order for the system to determine that possible-fraud is exhibited; but rather, detection of at least N such (or similar) abnormal jumps is required in order to determine that possible-fraud is exhibited (e.g., N such jumps within a single usage-session, or within a single logged-in session of a user). In still other embodiments, detection of a single, isolated, "jump" or abnormal displacement of the on-screen pointer, does not suffice in order for the system to determine that possible-fraud is exhibited; but rather, detection of at least N such (or similar) abnormal jumps within a pre-defined time-frame is required in order to determine that possible-fraud is exhibited (e.g., N such jumps within a period of 1 second or 5 seconds or 30 seconds or 60 seconds or K seconds).

In some embodiments, for example, the Bot/Malware/Script Identifier 170 and/or its associated components may perform: (A) by using a Click/Tap Locator 178, detecting a first click or tap, performed at a first on-screen location; (B) subsequently, detecting a second click or tap, performed at a second on-screen location; (C) by using an In-Between Clicks/Taps Tracker 179, detecting that no input-unit events were registered between (i) detection of the first click or tap and (ii) detection of the second click or tap; (D) based on the detecting of step (C), determining that said electronic device is more-probably (or, most-probably; or absolutely, or certainly, or necessarily) controlled by an automated attacking module, and not by a legitimate human user. For example, the system may detect that a first mouse-click or screen-tap was registered at screen location (30, 40); and that two seconds later, a second mouse-click or screen-tap was registered at screen location (180, 230); however, no input-unit events (e.g., no mouse-dragging, no touch-screen finger dragging, no touch-pad finger dragging) were registered during that time-interval of two seconds between the two clicks or taps; thereby indicating that a nun-human script or malware is more-probably (or, most-probably; or absolutely, or certainly, or necessarily) the generator of those two clicks or taps.

In some embodiments, for example, the Bot/Malware/Script Identifier 170 and/or its associated components may perform: (A) detecting a first click or tap, performed at a first on-screen location; (B) subsequently, detecting a second click or tap, performed at a second on-screen location; (C) detecting that one or more input-unit were registered between (i) detection of the first click or tap and (ii) detection of the second click or tap; and also, determining that the one or more input-unit events, that were registered, do not suffice for displacing an on-screen pointer to displace from the first on-screen location to the second on-screen location; (D) based on the determining of step (C), determining that said electronic device is more-probably (or, most-probably; or absolutely, or certainly, or necessarily) controlled by an automated attacking module, and not by a legitimate human user. For example, the system may detect that a first mouse-click or screen-tap was registered at screen location (100, 100); and that two seconds later, a second mouse-click or screen-tap was registered at screen location (130, 140), such that the diagonal distance between the two on-screen locations is 50 pixels; however, the input-unit events (e.g., mouse-dragging, touch-screen finger dragging, touch-pad finger dragging) that were registered during that time-interval of two seconds between the two clicks or taps, suffices only to an actual displacement of 24 pixels and not the reported displacement of 50 pixels diagonally; thereby indicating that a nun-human script or malware is more-probably (or, most-probably; or absolutely, or certainly, or necessarily) the generator of those two clicks or taps In some embodiments, for example, the Bot/Malware/Script Identifier 170 and/or its associated components may perform: (A) by using a Key-Down/Key-Up Events Monitor 180, monitoring key-down events, and key-up events, during a usage session in which said electronic device exhibits reception of keyboard input; (B) by using a Key-Down/Key-Up Events Counter and Matching Module 181, determining that the number of key-down events does not match the number of key-up events, during said usage session; (C) based on the determining of step (B), determining that said electronic device is more-probably (or, most-probably; or absolutely, or certainly, or necessarily) controlled by an automated attacking module, and not by a legitimate human user. For example, within a usage session, or within a time period associated with filling-out of a form or of a field, or within a pre-defined time period (e.g., 5 seconds, or K seconds), there may be counted 24 key-down events and only 21 key-up events; thereby indicating that a non-human malware or attacker is in charge and/or is spoofing or faking keyboard data or other input entry data.

In some embodiments, for example, the Bot/Malware/Script Identifier 170 and/or its associated components may perform: (A) monitoring key-down events, and key-up events, during a usage session in which said electronic device exhibits reception of keyboard input; (B) by using a Key-Down/Key-Up Sequencer 188, determining that the order of the key-down events and the key-up events, during said usage session, does not match an expected order of key-down events and key-up events that is expected to be observed if an input unit of said electronic device is utilized for typing by a human user; (C) based on the determining of step (B), determining that said electronic device is more-probably (or, most-probably; or absolutely, or certainly, or necessarily) controlled by an automated attacking module, and not by a legitimate human user. For example, the system may determine that even though the total number of key-down events is identical (or is similar to, or close to, beyond a pre-defined threshold value or percentage) to the total number of key-down events (e.g., 24 key-down events, and 24 or 23 key-up events), still, the sequence or the ordering or the pattern of such key events does not characterize a human user entering data manually; for example, detecting that instead of alternating between a key-down event and a key-up event, the sequence of events shows a series of 7 key-down events, follows by a sequence of 5 key-up events, followed by a sequence of 12 key-down events, followed by a sequence of 3 key-up events, and so forth; thereby indicating that more-probably (or, most-probably; or absolutely, or certainly, or necessarily) a non-human user is spoofing input data, or is attempting to imitate (e.g., imperfectly) manual entry of data.

In some embodiments, for example, the Bot/Malware/Script Identifier 170 and/or its associated components may perform: (A) monitoring key-down events, and key-up events, during a usage session in which said electronic device exhibits reception of keyboard input; (B) by using a Keys/Content Discrepancy Detector 182, determining that at least one of: (i) the key-down events that were registered by the electronic device during said usage session, and (ii) the key-up events that were registered by the electronic device during said usage session, does not match the number of characters that said electronic device registered as received from a keyboard; (C) based on the determining of step (B), determining that said electronic device is more-probably (or, most-probably; or absolutely, or certainly, or necessarily) controlled by an automated attacking module, and not by a legitimate human user. For example, the system may detect 28 key-down events, and 28 key-up event, such that their total number match, and their sequence may be correct (e.g., alternating between key-down and key-up); however, at the same time interval, the electronic device also reported or registered or transmitted a message indicating that a total of 37 characters were allegedly typed or manually-entered, and not 24 characters as expected; thereby indicating possible fraud by an automated script or malware or "bot".

In some embodiments, for example, the Bot/Malware/Script Identifier 170 and/or its associated components may perform: (A) monitoring key-down events, and key-up events, during a usage session in which said electronic device exhibits reception of keyboard input; (B) by using a Keys/Timing Scheme Analyzer 183, determining that (I) a timing scheme that characterizes the monitored key-down events and the monitored key-up events, during said usage session, does not match (II) a timing scheme of entry of typed characters as actually registered by the electronic device; (C) based on the determining of step (B), determining that said electronic device is more-probably (or, most-probably; or absolutely, or certainly, or necessarily) controlled by an automated attacking module, and not by a legitimate human user. For example, the system may detect that even though 24 key-down events and 24 key-up events were registered, their timing pattern does not match the timing pattern of actual content as entered; such that, for example, the input-unit indicates that all 24 characters were manually entered within a time-frame of three seconds using a generally-constant typing speed, whereas the electronic device and/or its applications (e.g., Web browser, native application, or the like) indicate that the manual entry of data had a different timing scheme (e.g., that a first field was filled-out within 4 seconds, then no input-unit events were registered for 7 seconds, then a second field was filled-out within 5 seconds). Such different, non-matching, timing schemes or timing patterns, may allow the system to determine or to estimate that a fraudulent malware is operating the device, rather than a legitimate human user.

In some embodiments, for example, the Bot/Malware/Script Identifier 170 and/or its associated components may perform: (A) continuously monitoring mouse events, during a usage session in which said electronic device exhibits reception of mouse-based input; (B) determining that during a first period of time within said usage session, the monitored mouse events exhibit a first sampling rate; (C) determining that during a second period of time within said usage session, the monitored mouse events exhibit a second, different, sampling rate; (D) based on the determining of steps (B) and (C), further determining that said electronic device is more-probably (or, most-probably; or absolutely, or certainly, or necessarily) controlled by an automated attacking module, and not by a legitimate human user. These operations may be performed by an Input-Unit Sampling-Rate Tracker and Analyzer 184, which may monitor and track and/or identify the sampling rate of an input-unit (e.g., a mouse), and may detect that the sampling rate changes (e.g., from 40 Hz to 28 Hz) within a single usage session or within a pre-defined time-frame (e.g., within 1 minutes, or within K seconds); thereby indicating that an automated attack script is more-probably (or, most-probably; or absolutely, or certainly, or necessarily) controlling (or spoofing, or replacing, or modifying, or faking) the input-unit data In some embodiments, for example, the Bot/Malware/Script Identifier 170 and/or its associated components may perform: (A) continuously monitoring keyboard events, during a usage session in which said electronic device exhibits reception of keyboard-based input; (B) determining that during a first period of time within said usage session, the monitored keyboard events exhibit a first sampling rate; (C) determining that during a second period of time within said usage session, the monitored keyboard events exhibit a second, different, sampling rate; (D) based on the determining of steps (B) and (C), further determining that said electronic device is more-probably (or, most-probably; or absolutely, or certainly, or necessarily) controlled by an automated attacking module, and not by a legitimate human user. These operations may be performed by the Input-Unit Sampling-Rate Tracker and Analyzer 184, which may be adapted to monitor or track various types of input units, e.g., mouse, touch-pad, touch-screen, keyboard, or the like; and to further determine that the sampling rates of two (or more) input units do not match each other.

In some embodiments, for example, the Bot/Malware/Script Identifier 170 and/or its associated components may perform: (A) continuously monitoring keyboard events and mouse events, during a usage session in which said electronic device exhibits reception of keyboard-based input; (B) determining that during said usage session, the monitored keyboard events exhibit a first sampling rate; (C) determining that during said usage session, the monitored mouse events exhibit a second, different, sampling rate; (D) based on the determining of steps (B) and (C), further determining that said electronic device is more-probably (or, most-probably; or absolutely, or certainly, or necessarily) controlled by an automated attacking module, and not by a legitimate human user. For example, a change of keyboard sampling rate, within a usage session or within a pre-defined time-frame or usage (e.g., within 10 seconds, or within K seconds), may be used as indicator or a malware or script that attempts to (imperfectly) emulate or simulate or spoof or fake keyboard-data entry.

In some embodiments, for example, the Bot/Malware/Script Identifier 170 and/or its associated components may perform: (A) detecting that an input-unit level of the electronic device reports that a message of M characters were manually entered via an input-unit of the electronic device; (B) detecting that said electronic device sends to a remote server, an outgoing message of N characters that was allegedly typed on said electronic device, wherein N is different than M; then, (C) based on the determining of steps (A) and (B), further determining that said electronic device is more-probably (or, most-probably; or absolutely, or certainly, or necessarily) controlled by an automated attacking module, and not by a legitimate human user. These operations may be performed by a Content/Input-Unit-Event Discrepancy Detector 185, which may detect that even though a username (or an account number, or beneficiary name) of 12 characters was submitted by the electronic device to a remote server, the actually-registered input-unit events do not support or do not match manual entry of 12 characters, or match or support manual entry of zero characters or of 9 characters or of 17 characters, thereby indicating that an automatic script or malware may be operational and modifying (or replacing, or spoofing) data as part of an attack or cyber-attack.

In some embodiments, for example, the Bot/Malware/Script Identifier 170 and/or its associated components may perform: (A) detecting that the electronic device sends to a remote server, a message indicating that a string of characters was manually entered by a user in a particular field of a particular fillable form; (B) based on monitoring of input-unit interactions of said electronic device, determining that the input unit of the electronic device did not register any manual input during the time-period that corresponds to alleged manual data entry of said particular field of said particular fillable form; (C) based on the determining of steps (A) and (B), further determining that said electronic device is more-probably (or, most-probably; or absolutely, or certainly, or necessarily) controlled by an automated attacking module, and not by a legitimate human user. For example, a Timing/Input-Unit-Event Discrepancy Detector 186 may detect that a timing scheme, or time-frame length, of manual entry of data as registered by the input unit(s), does not match or does not support (or does not suffice for; or is excess relative to) the actual content or length or timing of the message (or content, or payload) that was allegedly entered and then stored or transmitted or submitted. Additionally or alternatively, a Local Input-Unit Events/Transmitted Content Matcher 187 may detect or determine discrepancy between the content as transmitted out to a remote server, and the manual-entry of data as typed or entered locally on the electronic device (e.g., the input-unit monitoring shows that the user entered 6 characters into a username field, but an outgoing message or query from the electronic device shows that a username of 10 characters is being sent out to a remote server).

In some embodiments, for example, the Bot/Malware/Script Identifier 170 and/or its associated components may perform: (A) detecting that the electronic device sends to a remote server, a message indicating that a string of characters was manually entered by a user in a particular field of a particular fillable form; (B) based on monitoring of input-unit interactions of said electronic device, determining that the input unit of the electronic device registered manual input during the time-period that corresponds to alleged manual data entry of said particular field of said particular fillable form; and further determining that the manual input, as registered by the input unit of the electronic device, does not yield said string of characters that said message indicates as manually entered; (C) based on the determining of steps (A) and (B), further determining that said electronic device is more-probably (or, most-probably; or absolutely, or certainly, or necessarily) controlled by an automated attacking module, and not by a legitimate human user. For example, even though the system detects that actual input-unit events were registered, the system may deduce that carrying-out of the registered input-unit events would not yield the alleged content that was allegedly entered manually (and then, for example, stored locally, or transmitted or submitted to a remote server).

In some embodiments, for example, the Bot/Malware/Script Identifier 170 and/or its associated components may perform: (A) by utilizing an Active-Process Detector of Malware 191, performing an active malware detection process, which comprises: injecting an input-output aberration into a web-page, and monitoring whether manual corrective actions were manually performed in response to the input-output aberration; (B) based on the active malware detection process, and by utilizing a Candidates List Generator 193, generating a list of possibly-fraudulent usage sessions in which at least one of the following conditions holds true: (I) no corrective actions were performed, or (II) corrective actions that were performed were insufficient to adequately cure the input-output aberration; then, (C) by using a Passive-Process Detector of Malware 192, performing a passive malware detection process, which comprises: searching for a mismatch between (I) input-unit events as actually registered by one or more input units of the electronic device, and (II) content that was registered by the electronic device as allegedly being manually entered; then, (D) based on the passive malware detection process, by utilizing a Candidates List Diluter 194, diluting said list of possibly-fraudulent usage sessions, by removing (or filtering-out) from said list usage sessions that do not exhibit said mismatch of step (C).

In some embodiments, for example, the Bot/Malware/Script Identifier 170 and/or its associated components may perform: (A) performing a passive malware detection process, which comprises: searching for a mismatch between (I) input-unit events as actually registered by one or more input units of the electronic device, and (II) content that was registered by the electronic device as allegedly being manually entered; (B) based on the passive malware detection process, generating a list of possibly-fraudulent usage sessions, by removing from said list usage sessions that do not exhibit said mismatch of step (A); then, (C) performing an active malware detection process, which comprises: injecting an input-output aberration into a web-page, and monitoring whether manual corrective actions were manually performed in response to the input-output aberration; then, (D) based on the active malware detection process, diluting said list of possibly-fraudulent usage sessions, by removing from said list usage sessions in which a sufficient manual corrective action was detected in response to the input-output aberration.

It is noted that in accordance with the present invention, monitoring and/or analyzing of "user interactions" and/or "user gestures", may further comprise the monitoring and/or analyzing of interactions, gestures, and/or sensed data that is collected shortly before or immediately before the actual interaction, and/or interactions, gestures, and/or sensed data that is collected shortly after or immediately after the actual interaction; in addition to the data collected or sensed or monitored during the interaction itself.

The terms "mobile device" or "mobile electronic device" as used herein may include, for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, or the like.

The term "pointing device" as used herein may include, for example, a mouse, a trackball, a pointing stick, a stylus, a joystick, a motion-sensing input device, a touch screen, a touch-pad, or the like.

The terms "device" or "electronic device" as used herein may include, for example, a mobile device, a non-mobile device, a non-portable device, a desktop computer, a workstation, a computing terminal, a laptop computer, a notebook computer, a netbook computer, a computing device associated with a mouse or a similar pointing accessory, a smartphone, a tablet, a smart-watch, and/or other suitable machines or devices.

The term "genuine user" as used herein may include, for example, an owner of a device; a legal or lawful user of a device; an authorized user of a device; a person who has legal authorization and/or legal right to utilize a device, for general purpose(s) and/or for one or more particular purpose(s); or the person who had originally defined user credentials (e.g., username and password) for performing an activity through the device.

The term "fraudulent user" as used herein may include, for example, any person who is not the "genuine user" of the device; an attacker; an intruder; a man-in-the-middle attacker; a man-in-the-browser attacker; an unauthorized user; an impersonator; a hacker; a cracker; a person attempting to hack or crack or compromise a security measure utilized by the device or by a system or a service or a website, or utilized by an activity or service accessible through the device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass®); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may identify multiple (different) users that utilize the same device, or the same account, before or after a typical user profile is built, or even during a training period in which the system learns the behavioral patterns. This may be used for detection of "friendly fraud" incidents, or identification of users for accountability purposes, or identification of the user that utilized a particular function in an Administrator account (e.g., optionally used in conjunction with a requirement that certain users, or users with certain privileges, may not share their password or credentials with any other person); or identification of a licensee in order to detect or prevent software piracy or unauthorized usage by non-licensee user(s), for software or products that are sold or licensed on a per-user basis or a per-seat basis.

Some embodiments may be utilized to identify or detect a remote access attacker, or an attacker or a user that utilizes a remote access channel to access (or to attack, or to compromise) a computerized service, or an attacker or cyber-attacker or hacker or impostor or imposter or "fraudster" that poses as a genuine user or as a true owner of an account, or an automatic script or "bot" or malware. Some embodiments may be used to differentiate or distinguish among, for example, an authorized or legitimate or genuine or human user, as opposed to an illegitimate and/or unauthorized and/or impostor human attacker or human user, and/or as opposed to a "bot" or automatic script or automated script or automated program or malware.

Some embodiments may be utilized for authenticating, or confirming the identity of, a user who is already logged-in or signed-in; or conversely, a user that did not perform (or did not yet perform, or did not complete) a log-in or sign-in process; or a user that did not successfully perform a log-in or sign-in process; or a user who is interacting with a computerized service prior to signing-in or logging in (e.g., filling-out fields in an electronic commerce website as part of checking-out as a guest), or during a log-in process, or after a log-in process; or to confirm the identity of a user who is already-logged-in, or who is not-yet logged-in, or who operates a system or service that does not necessarily require or utilize a log-in process.

The term "password" as used herein may be or may comprise, for example, a password or pass-phrase or Personal Identification Number (PIN), or other data-item or secret, or other confidential data-item, which may be used for user authentication or for logging-in or sign-in of a user into an electronic device (e.g., smartphone, tablet, smartwatch, laptop computer, desktop computer) or a service (e.g., banking service or website, brokerage service or website, email account, web-mail, social network, online vendor, online merchant, electronic commerce website or application or "app"), or other data-item or string that may be used as authentication factor or authentication step (e.g., in a single-step or multiple-step authentication process), or other log-in data that may be used in order to authorized access to a privileged service and/or to a privileged location (e.g., entry into, or exit from, or passage through a gate or card-reader or turnstile), or other log-in data item that may be used in order to authorize a user to perform privileged actions (e.g., to unlock or open a device or a vehicle; to start or ignite a vehicle; to drive a vehicle).

The terms "service" or "computerized service", as used herein, may be or may comprise any suitable service, or system, or device, which may require user authentication in order to authorize user access to it, or in order to authorize performance of one or more particular actions; including, but not limited to, for example, user authentication for accessing or operating or unlocking an electronic device (e.g., smartphone, tablet, smart-watch, laptop computer, desktop computer, smart-home device or appliance, Internet of Things (IoT) device) or service (e.g., banking service or website, brokerage service or website, email account, web-mail, social network, online vendor, online merchant, electronic commerce website or application or "app"), or other system or platform that requires user authentication (e.g., entry into, or exit from, or passage through a gate or card-reader or turnstile; to unlock or open a device or a vehicle; to start or ignite a vehicle; to drive a vehicle).

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

In accordance with some embodiments of the present invention, a method comprises: (A) analyzing a content of a web-page which comprises a plurality of User Interface (UI) elements that can be engaged by a user; (B) based on contextual analysis of said web-page, assigning a fraud-relatedness score-value to at least one UI element of said web-page.

In some embodiments, the method comprises: (a) identifying in said web-page a first UI element and a second UI element; (b) determining that the first UI element is a UI element that a fraudulent user typically engages in order to achieve a fraudulent result; (c) determining that the second UI element is a UI element that a fraudulent user typically does not engage; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a fraudulent user, would cause monetary damage to a genuine account owner associated with said web-page; (c) determining that the second UI element is a UI element that, if engaged by a fraudulent user, would not cause monetary damage; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a user, enables the user to purchase goods or services; (c) determining that the second UI element is a UI element that, if engaged by a fraudulent user, performs an operation other than purchase of goods or services; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a user, enables the user to perform an electronic payment; (c) determining that the second UI element is a UI element that, if engaged by a fraudulent user, performs an operation other than an electronic payment; (d) assigning to the first UI element a first fraud-relatedness score-value, and assigning to the second UI element a second, lower, fraud-relatedness score-value.

In some embodiments, the method comprises: (a) identifying in said web-page a first UI element and a second UI element; (b) determining that the first UI element is a UI element that, if engaged by a user, creates a potential security risk to an administrator of said web-page; (c) determining that the second UI element is a UI element that, if engaged by a fraudulent user, does not create a potential security risk to an administrator of said web-page; (d) assigning to the first UI element a first fraud-relatedness score-value, and assigning to the second UI element a second, lower, fraud-relatedness score-value.

In some embodiments, the method comprises: generating a security-exposure map of UI elements of said web-page, by generating a first indication that user-engagement with a first particular UI element on said web-page creates a potential security risk for an administrator of said web-page, and by generating a second indication that user-engagement with a second particular UI element on said web-page does not create a potential security risk for the administrator of said web-page.

In some embodiments, the method comprises: (i) detecting that a user engages the first particular UI element on said web-page which creates a potential security risk for an administrator of said web-page; (ii) in response to said detecting of step (i), generating a possible-fraud notification.

In some embodiments, the method comprises: (i) detecting that a user engages the first particular UI element on said web-page which creates a potential security risk for an administrator of said web-page; (ii) extracting from monitored input-output interactions of said user, a user-specific behavioral characteristic that indicates that said user is possibly attempting to perform a fraudulent operation; (iii) in response to cumulative detections of step (i) and step (ii), generating a possible-fraud notification.

In some embodiments, the method comprises: (i) detecting that a user engages the first particular UI element on said web-page which creates a potential security risk for an administrator of said web-page; (ii) injecting an input-output aberration to said web-page; monitoring user interactions in response to said input-output aberration; and extracting from monitored input-output interactions of said user, a user-specific behavioral characteristic that indicates that said user is possibly attempting to perform a fraudulent operation; (iii) in response to cumulative detections of step (i) and step (ii), generating a possible-fraud notification.

In some embodiments, the method comprises: generating a fraud-exposure map of UI elements of said web-page, by generating a first indication that user-engagement with a first particular UI element on said web-page creates a potential fraud risk for an administrator of said web-page, and by generating a second indication that user-engagement with a second particular UI element on said web-page does not create a potential fraud risk for the administrator of said web-page.

In some embodiments, the method comprises: (i) detecting that a user engages the first particular UI element on said web-page which creates a potential fraud risk for an administrator of said web-page; (ii) extracting from monitored input-output interactions of said user, a user-specific behavioral characteristic that indicates that said user is possibly attempting to perform a fraudulent operation; (iii) in response to cumulative detections of step (i) and step (ii), generating a possible-fraud notification.

In some embodiments, the method comprises: (i) detecting that a user engages the first particular UI element on said web-page which creates a potential fraud risk for an administrator of said web-page; (ii) injecting an input-output aberration to said web-page; monitoring user interactions in response to said input-output aberration; and extracting from monitored input-output interactions of said user, a user-specific behavioral characteristic that indicates that said user is possibly attempting to perform a fraudulent operation; (iii) in response to cumulative detections of step (i) and step (ii), generating a possible-fraud notification.

In some embodiments, said web-page is an HTML-based page that is accessible through a web browser.

In some embodiments, said web-page is a component of a native mobile application.

In some embodiments, a system comprises: a web-page analyzer to analyze a content of a web-page which comprises a plurality of User Interface (UI) elements that can be engaged by a user; a contextual analysis module to perform contextual analysis of said web-page; a fraud-relatedness score-value generator, to generate a fraud-relatedness score-value to at least one UI element of said web-page; wherein the web-page analyzer is: (a) to identify in said web-page a first UI element and a second UI element; (b) to determine that the first UI element is a UI element that a fraudulent user typically engages in order to achieve a fraudulent result; (c) to determine that the second UI element is a UI element that a fraudulent user typically does not engage; (d) to assign to the first UI element a first fraud-relatedness score-value, and to assign to the second UI element a second, lower, fraud-relatedness score-value.

In some embodiments, the system comprises: a web-page heat-map generator to generate a heat-map for said web-page, wherein the heat-map indicates which particular UI elements of said web-page are typically engaged by cyber-attackers, and which other UI elements of said web-page are typically not engaged by cyber-attackers.

In some embodiments, the system comprises: a UI-element-based fraud estimation module, to determine whether an engagement of a particular user with a particular UI element is fraudulent, based on both: (I) a fraud-related score-value that was generated for said particular UI element, and (II) user-specific characteristics that are extracted from input-unit interactions performed by said particular user in conjunction with engagement with said particular UI element.

In some embodiments, the system comprises: a UI-element-based fraud estimation module, to determine whether an engagement of a particular user with a particular UI element is fraudulent, based cumulatively on: (I) a fraud-related score-value that was generated for said particular UI element, and (II) user-specific characteristics that are extracted from input-unit interactions performed by said particular user in conjunction with engagement with said particular UI element, and (III) reaction of said particular user to an input-output aberration that is introduced to said web-page and which causes an irregularity in input-output interactions on said web-page.

Some embodiments of the present invention may comprise devices, systems, and methods of contextual mapping of web-page elements and other User Interface elements; for example, for the purpose of differentiating between fraudulent transactions and legitimate transactions, and/or for the purpose of distinguishing between a fraudulent user and a legitimate user. For example, User Interface (UI) elements of a website or webpage or application or other computerized service, are contextually analyzed. A first User Interface element is assigned a low fraud-relatedness score-value, since user engagement with the first User Interface element does not create a security risk or a monetary exposure. A second, different, User Interface element is assigned a high fraud-relatedness score-value, since user engagement with the second User Interface element creates a security risk or a monetary exposure. The fraud-relatedness score-values are taken into account, optionally together with user-specific behavioral characteristics, in order to determine whether to generate a possible-fraud notification, or as part of generating a possible-fraud score for a particular set-of-operations.

The present invention may include, for example, systems, devices, and methods for contextual mapping and/or contextual analysis of web-pages or websites or applications, as well as generating fraud-relatedness score-values which may then be utilized for estimating or determining a possible-fraud score, or for determining whether a transaction or a set-of-operations is estimated to be fraudulent.

The present invention may include devices, systems, and methods of contextual mapping of web-page elements and other User Interface elements, for the purpose of differentiating between fraudulent transactions and legitimate transactions, or for the purpose of distinguishing between a fraudulent user and a legitimate user. For example, User Interface elements of a website or webpage or application or other computerized service, are contextually analyzed. A first User Interface element is assigned a low fraud-relatedness score-value, since user engagement with the first User Interface element does not create a security risk or a monetary exposure. A second, different, User Interface element is assigned a high fraud-relatedness score-value, since user engagement with the second User Interface element creates a security risk or a monetary exposure. The fraud-relatedness score-values are taken into account, together with user-specific behavioral characteristics, in order to determine whether to generate a possible-fraud notification, or as part of generating a possible-fraud score for a particular set-of-operations.

In accordance with some demonstrative embodiments of the present invention, a method comprises: (A) detecting an automated malware that emulates human interactions with an input-unit of an electronic device; wherein the detecting of step (A) comprises: (a) monitoring input-unit interactions of said electronic device; (b) analyzing said input-unit interactions; (c) determining that it is impossible for a human user to perform said input-user interactions; (d) based on the determining of step (c), determining that said input-unit interactions were more-probably (or, most-probably; or absolutely, or certainly, or necessarily) performed by said automated script that emulates human interactions, and not by a human user.

In some embodiments, the method and/or particularly steps (b) and (c) and (d), may comprise: detecting that said input-unit interactions comprise an on-screen displacement-jump of an on-screen pointer, from a first on-screen location, to a second and non-adjacent on-screen location; based on said on-screen displacement-jump of the on-screen pointer, determining that said input-unit interactions were more-probably (or, most-probably; or absolutely, or certainly, or necessarily) performed by said automated script that emulates human interactions, and not by a human user.

In some embodiments, the method and/or particularly steps (b) and (c) and (d), may comprise: detecting that said input-unit interactions comprise an on-screen displacement-jump of an on-screen pointer, from a first on-screen location, to a second and non-adjacent on-screen location; and further detecting that said on-screen displacement-jump is not accompanied by any input-user gesture that is required for commanding said displacement-jump; based on said on-screen displacement-jump of the on-screen pointer, determining that said input-unit interactions were more-probably (or, most-probably; or absolutely, or certainly, or necessarily) performed by said automated script that emulates human interactions, and not by a human user.

In some embodiments, the method and/or particularly steps (b) and (c) and (d), may comprise: detecting that said input-unit interactions comprise an on-screen displacement-jump of an on-screen pointer, from a first on-screen location, to a second and non-adjacent on-screen location; and further detecting that said on-screen displacement-jump is accompanied by one or more input-user gestures that are insufficient for commanding said displacement-jump; based on said on-screen displacement-jump of the on-screen pointer, determining that said input-unit interactions were more-probably (or, most-probably; or absolutely, or certainly, or necessarily) performed by said automated script that emulates human interactions, and not by a human user.

In some embodiments, the method and/or particularly steps (b) and (c) and (d), may comprise: (i) detecting that said input-unit interactions comprise an on-screen displacement-jump of an on-screen pointer, from a first on-screen location, to a second and non-adjacent on-screen location; and further determining that said on-screen displacement-jump of the on-screen pointer does not match statistical distribution of input-unit utilization by human users; (ii) based on step (i), determining that said input-unit interactions were more-probably (or, most-probably; or absolutely, or certainly, or necessarily) performed by said automated script that emulates human interactions, and not by a human user.

In some embodiments, the method and/or particularly steps (b) and (c) and (d), may comprise: (i) detecting that said input-unit interactions exhibit rapid displacement-jumps of an on-screen pointer, among non-adjacent on-screen locations, wherein said rapid displacement-jumps comprise two or more on-screen pointer displacement-jumps that occur within a pre-defined time period; (ii) based on step (i), determining that said input-unit interactions were more-probably (or, most-probably; or absolutely, or certainly, or necessarily) performed by said automated script that emulates human interactions, and not by a human user.

In some embodiments, the method and/or particularly steps (b) and (c) and (d), may comprise: (i) detecting a first click or tap, performed at a first on-screen location; (ii) subsequently, detecting a second click or tap, performed at a second on-screen location; (iii) detecting that no input-unit events were registered between (I) detection of the first click or tap at the first on-screen location, and (II) detection of the second click or tap at the second on-screen location; (iv) based on step (iii), determining that said input-unit interactions were more-probably (or, most-probably; or absolutely, or certainly, or necessarily) performed by said automated script that emulates human interactions, and not by a human user.

In some embodiments, the method and/or particularly steps (b) and (c) and (d), may comprise: (i) detecting a first click or tap, performed at a first on-screen location, occurred concurrently with a second click or tap performed at a second, different, on-screen location; (ii) based on step (i), determining that said input-unit interactions were more-probably (or, most-probably; or absolutely, or certainly, or necessarily) performed by said automated script that emulates human interactions, and not by a human user.

In some embodiments, the method and/or particularly steps (b) and (c) and (d), may comprise: (i) monitoring key-down events, and key-up events, during a usage session in which said electronic device exhibits reception of keyboard input; (ii) determining that the number of key-down events does not match the number of key-up events, during said usage session; (iii) based on step (ii), determining that said input-unit interactions were more-probably (or, most-probably; or absolutely, or certainly, or necessarily) performed by said automated script that emulates human interactions, and not by a human user.

In some embodiments, the method and/or particularly steps (b) and (c) and (d), may comprise: (i) monitoring key-down events, and monitoring key-up events, during a usage session in which said electronic device exhibits reception of keyboard input; (ii) determining that the order of the key-down events and the key-up events, during said usage session, does not match an expected order of key-down events and key-up events that is expected to be observed if an input unit of said electronic device is utilized for typing by a human user; (iii) based on step (ii), determining that said input-unit interactions were more-probably (or, most-probably; or absolutely, or certainly, or necessarily) performed by said automated script that emulates human interactions, and not by a human user.

In some embodiments, the method and/or particularly steps (b) and (c) and (d), may comprise: (i) monitoring key-down events, and monitoring key-up events, during a usage session in which said electronic device exhibits reception of keyboard input; (ii) determining that at least one of: (I) the key-down events that were registered by the electronic device during said usage session, and (II) the key-up events that were registered by the electronic device during said usage session, does not match the number of characters that said electronic device registered as received from a keyboard; (iii) based on the determining of step (i), determining that said electronic device is more-probably (or, most-probably; or absolutely, or certainly, or necessarily) controlled by an automated attacking module, and not by a legitimate human user.

In some embodiments, the method and/or particularly steps (b) and (c) and (d), may comprise: (i) monitoring key-down events, and monitoring key-up events, during a usage session in which said electronic device exhibits reception of keyboard input; (ii) determining that (I) a timing scheme that characterizes the monitored key-down events and the monitored key-up events, during said usage session, does not match (II) a timing scheme of entry of typed characters as actually registered by the electronic device; (iii) based on the determining of step (i), determining that said electronic device is more-probably (or, most-probably; or absolutely, or certainly, or necessarily) controlled by an automated attacking module, and not by a legitimate human user.

In some embodiments, the method and/or particularly steps (b) and (c) and (d), may comprise: (i) continuously monitoring mouse events, during a usage session in which said electronic device exhibits reception of mouse-based input; (ii) determining that during a first period of time within said usage session, the monitored mouse events exhibit a first sampling rate; (iii) determining that during a second period of time within said usage session, the monitored mouse events exhibit a second, different, sampling rate; (iv) based on steps (ii) and (iii), determining that said electronic device is more-probably (or, most-probably; or absolutely, or certainly, or necessarily) controlled by an automated attacking module, and not by a legitimate human user.

In some embodiments, the method and/or particularly steps (b) and (c) and (d), may comprise: (i) continuously monitoring keyboard events, during a usage session in which said electronic device exhibits reception of keyboard-based input; (ii) determining that during a first period of time within said usage session, the monitored keyboard events exhibit a first sampling rate; (iii) determining that during a second period of time within said usage session, the monitored keyboard events exhibit a second, different, sampling rate; (iv) based on steps (ii) and (iii), determining that said electronic device is more-probably (or, most-probably; or absolutely, or certainly, or necessarily) controlled by an automated attacking module, and not by a legitimate human user.

In some embodiments, the method and/or particularly steps (b) and (c) and (d), may comprise: (i) continuously monitoring keyboard events and mouse events, during a usage session in which said electronic device exhibits reception of keyboard-based input; (ii) determining that during said usage session, the monitored keyboard events exhibit a first sampling rate; (iii) determining that during said usage session, the monitored mouse events exhibit a second, different, sampling rate; (iv) based on steps (ii) and (iii), determining that said electronic device is more-probably (or, most-probably; or absolutely, or certainly, or necessarily) controlled by an automated attacking module, and not by a legitimate human user.

In some embodiments, the method and/or particularly steps (b) and (c) and (d), may comprise: (i) detecting that an input-unit level of the electronic device reports that a message of M characters were manually entered via an input-unit of the electronic device; (ii) detecting that said electronic device sends to a remote server, an outgoing message of N characters that was allegedly typed on said electronic device, wherein N is different than M; (iii) based on the determining of steps (i) and (ii), further determining that said electronic device is more-probably (or, most-probably; or absolutely, or certainly, or necessarily) controlled by an automated attacking module, and not by a legitimate human user.

In some embodiments, the method and/or particularly steps (b) and (c) and (d), may comprise: (i) detecting that the electronic device sends to a remote server, a message indicating that a string of characters was manually entered by a user in a particular field of a particular fillable form; (ii) based on monitoring of input-unit interactions of said electronic device, determining that the input unit of the electronic device did not register any manual input during the time-period that corresponds to alleged manual data entry of said particular field of said particular fillable form; (iii) based on the determining of step (ii), further determining that said electronic device is more-probably (or, most-probably; or absolutely, or certainly, or necessarily) controlled by an automated attacking module, and not by a legitimate human user.

In some embodiments, the method and/or particularly steps (b) and (c) and (d), may comprise: (i) detecting that the electronic device sends to a remote server, a message indicating that a string of characters was manually entered by a user in a particular field of a particular fillable form; (ii) based on monitoring of input-unit interactions of said electronic device, determining that the input unit of the electronic device registered manual input during the time-period that corresponds to alleged manual data entry of said particular field of said particular fillable form; and further determining that the manual input, as registered by the input unit of the electronic device, does not yield said string of characters that said message indicates as manually entered; (iii) based on the determining of steps (i) and (ii), further determining that said electronic device is more-probably (or, most-probably; or absolutely, or certainly, or necessarily) controlled by an automated attacking module, and not by a legitimate human user.

In some embodiments, the method and/or particularly steps (b) and (c) and (d), may comprise: (i) performing an active process of malware detection, which comprises: injecting an input-output aberration into a web-page, and monitoring whether manual corrective actions were manually performed in response to the input-output aberration; (ii) based on the active process of malware detection, generating a list of possibly-fraudulent usage sessions in which at least one of the following conditions holds true: (I) no corrective actions were performed, or (II) corrective actions that were performed were insufficient to adequately cure the input-output aberration; (iii) performing a passive process of malware detection, which comprises: searching for a mismatch between (I) input-unit events as actually registered by one or more input units of the electronic device, and (II) content that was registered by the electronic device as allegedly being manually entered; (iv) based on the passive process of malware detection, diluting said list of possibly-fraudulent usage sessions, by removing from said list usage sessions that do not exhibit said mismatch of step (iii).

In some embodiments, the method and/or particularly steps (b) and (c) and (d), may comprise: (i) performing a passive process of malware detection, which comprises: searching for a mismatch between (I) input-unit events as actually registered by one or more input units of the electronic device, and (II) content that was registered by the electronic device as allegedly being manually entered; then, (ii) based on the passive process of malware detection, generating a list of possibly-fraudulent usage sessions, by removing from said list usage sessions that do not exhibit said mismatch of step (i); then, (iii) performing an active process of malware detection, which comprises: injecting an input-output aberration into a web-page, and monitoring whether manual corrective actions were manually performed in response to the input-output aberration; then, (iv) based on the active process of malware detection, diluting said list of possibly-fraudulent usage sessions, by removing from said list usage sessions in which a sufficient manual corrective action was detected in response to the input-output aberration.

In some embodiments, a system may comprise: a fraud detection unit to detect an automated malware that emulates human interactions with an input-unit of an electronic device; wherein the fraud detection unit is configured to: (a) monitor input-unit interactions of said electronic device; (b) statistically analyze said input-unit interactions; (c) determine that a statistical characteristic of said input-user interactions, does not match statistical properties of human-users input-unit interactions; (d) based on step (c), to determine that said input-unit interactions were more-probably (or, most-probably; or absolutely, or certainly, or necessarily) performed by said automated script that emulates human interactions, and not by a human user.

In accordance with the present invention, a computerized system and/or a computerized process or method may be able to detect that certain operations and/or GUI-operations and/or UI-operations and/or gestures registered or received by an input unit, or that a certain set or batch of such operations, are absolutely impossible for a human user to perform, and thus the system or method determines that such operations must have been performed by an automated unit (e.g., computerized "bot", or automated script, or automated malware). In some embodiments, the system and the method of the present invention does not rely on a "likelihood" or a "probability" that such operations have "probably" or "more probably" or "most probably" been performed by a computerized unit and not by a human; but rather, the system and method of the present invention may reach a conclusive, absolute-truth determination regarding such classification of operations as necessarily performed by a computerized unit or non-human operator.

In a first example, a conventional system may monitor mouse interactions and may detect that across three consecutive screens, the computer-mouse was clicked on the "submit" button at the same, exact, on-screen coordinates of (X1, Y1); and may thus determine or may assume, incorrectly, that such operations were "more likely" or "most likely" or "probably" or "most probably" performed by a computerized unit and not by a human user. However, the Applicants have realized that this conventional approach is mistaken, and/or produces "false positive" identifications of computerized bots, and/or produces "false negative" decisions with regard to humanity or live-ness or non-robot characteristic of the user. For example, the Applicants have realized that it is absolutely possible for a human user, to click on multiple "submit" buttons, at exactly the same (X, Y) coordinates of the computer-mouse and/or the on-screen location; for example, if the human user is not moving at all his computer-mouse among such operations and only clicks, very carefully, on the left button of the computer mouse without changing the on-screen location or coordinates of the on-screen pointer.

Furthermore, the Applicants have realized that this "most unlikely" scenario actually occurs quite frequently, when the input unit is not a computer-mouse but is, for example, a touch-pad of a laptop. For example, an experienced human user who installs a new software or performs another process utilizing a "wizard" interface, may move the on-screen pointer one time to the "next" button on the screen using the touch-pad; and may then click on "next" repeatedly, across multiple screens of the installer program, via the button or buttons of the touch-pad, without at all moving the on-screen pointer and/or without touching the part of the touch-pad that causes such on-screen pointer In some embodiments, the system may comprise and/or may utilize a Humanly Impossible Operation(s) Detector, or other suitable unit or unit, able to detect and/or determine that a particular operation or a particular set or batch or group of operations, or input-unit gestures or inputs, are necessarily and absolutely impossible to have been performed manually by a human user, and/or necessarily have been produced or generated or inputted by a non-human user or unit. The Humanly Impossible Operation(s) Detector may utilize one or more pre-defined rules or criteria or threshold values or range of values, indicating a threshold or a range of measurable parameters which are humanly possible to be performed; and/or may utilize one or more pre-defined rules or criteria or threshold values or range of values, indicating a threshold or a range of measurable parameters which are humanly impossible to be performed.

For example, a pre-defined rule may indicate that it is humanly impossible to manually type more than N characters per second (by discrete keystrokes, not by copy-and-paste operation of a string); and that if, for example, the input unit (e.g., keyboard, touch-screen) indicates that 86 keystrokes (or, at least N keystrokes) were manually typed within two seconds, then it is an impossibility that this was performed manually by a human user, and that necessarily this was performed by a computerized "bot" or automated script or automated malware.

For example, a pre-defined rule may indicate that it is humanly impossible to manually fill-in more than N fields in a particular online form (by discrete keystrokes and/or by using copy-and-paste operation of strings); and that if, for example, the various input units (e.g., keyboard, touch-screen) or other units of the system indicate that 16 fields of a form (or, at least N fields of a form, or of a web-site or application or "app") were manually filled and/or submitted within two seconds, then it is an impossibility that this was performed manually by a human user, and that necessarily this was performed by a computerized "bot" or automated script or automated malware.

For example, a pre-defined rule may indicate that it is humanly impossible to manually perform more than N mouse-clicks or more than N touch-screen taps per second (at the same location and/or at different locations); and that if, for example, the input units (e.g., computer mouse, touch-screen) indicate that 147 (or at least N) mouse-clicks or screen-taps were manually detected within three seconds, then it is an impossibility that this was performed manually by a human user, and that necessarily this was performed by a computerized "bot" or automated script or automated malware.

For example, a pre-defined rule may indicate that it is humanly impossible to perform a first mouse-click (or touch-screen tap, or touch-pad tap) at a first pair of (X1, Y1) coordinates, and then within T or less milliseconds, to perform a second mouse-click (or touch-screen tap, or touch-pad tap) at a second pair of (X2, Y2) coordinates that is located at least a distance of D pixels or millimeters (or other distance units) from the first pair.

Some embodiments may utilize a "probably non-human" detection unit, or "most likely non-human" detection unit, which may initially estimate that an operation or a first of operations of a user are "probably" or "most likely" not a result of manual user operations; however, the system may further utilize an Overriding Decision Maker Unit, or a unit that may be referred to as a "Certainly/Absolutely non-human behavior detector", able to determine, based on one or more pre-defined rules or threshold values or conditions or criteria, that even though such operations appear to be non-humanly generated, they are in fact Humanly Possible (e.g., by an experienced or expert user, or alternatively by a careless user who clicked or tapped multiple times at the same spot) and therefore they should not trigger a determination of "necessarily Bot" but rather should trigger a determination of "human operator".

In some embodiments, the system may determine that certain on-screen pointer displacements or movements or "abrupt jumps" or offsets or irregularities, cannot be possibly performed by a human user, and can only be performed, necessarily, by computerized Bot/script.

It is noted that in some embodiments of the present invention, the determination whether a particular operation or set-of-operation can or cannot be humanly performed by a human user, or must necessarily be a product of an automated module, does Not need to be based on any real-life experience of a particular person or group of persons; but rather, may be based on one or more pre-defined criteria or conditions or rules or pre-set threshold values. For example, it may be humanly possible for a human user, to draw a perfect on-screen circle that corresponds exactly to the mathematical function of a circle, or to draw an exact right angle; however, although this is humanly possible, the system is pre-configured to determine that if a perfect circle (or, a perfect part-of-a-circle, or a perfect geometric shape) is drawn using a mouse or touch-pad or touch-screen, then this necessarily indicates that the operations were performed by a non-human unit.

This determination is not based on a "level of likeliness" that such operations were, or were not, produced by a human; since it is humanly possible to achieve this result via a manual operation, and since there is always a chance, even if it is a small chance, that the particular user that operates the computing device is a gifted user able to perform such operation perfectly and exactly like a computerized unit would perform The determination is not based on "likelihood" or on "probability", but rather, is based on a pre-defined rule or set-of-rules that define, in a strict manner, that even though it is humanly possible to perform a particular operation or set of operations or to achieve a particular result, still, such operation or set of operations or result are pre-defined to be necessarily a product of a computerized script or bot or malware, and/or are pre-defined to be a product of a non-human process or operator; thereby disregarding (or discarding) the physical possibility that such operations are, in fact, a product of a rare, human, user.

In some embodiments, a set of rules are pre-defined and are then utilized in order to classify a user interaction, or a set of user interactions, into a binary classification of either (I) certainly, absolutely, non-human interaction, or (II) certainly, absolutely, human interaction.

In some embodiments, a set of rules are pre-defined and are then utilized in order to classify a user interaction, or a set of user interactions, into a tertiary classification of one of three classes, either as (I) certainly, absolutely, non-human interaction, or (II) certainly, absolutely, human interaction, or (III) the analyzed data is insufficient to determine for certain whether the interaction is human or non-human.

In some embodiments, a set of rules are pre-defined based on one or more sources, to be utilized for the above-mentioned classifications and/or determining operations; such sources may be, for example: (a) One-time entry by a system administrator, of threshold values; e.g., the system administrator of a banking website defines and configures that if a user types manually at least K characters per second then the user is a non-human automated Bot or script or malware, and he sets the value of K based on a target level of sensitivity or fraud-tolerance that he wants the system to feature; for example, he may set K=56 to reduce the number of fraud alerts, or may set K=8 to increase the number of fraud alerts. (b) One-time entry by a system administrator, of threshold ranges of values; e.g., the system administrator of a banking website defines and configures that if a user types manually at least N2 characters per second then the user is certainly a non-human automated Bot or script or malware, wherein for example N2=50; and he further defines and configures that if a user types manually no more than N1 characters per second then the user is certainly human (or, no fraud alert is generated by examining the rate of typing), wherein for example N1=7; and he further defines and configures that if a user types manually between N1 to N2 characters per second, then there is insufficient interactions data to determine human or non-human characteristic of the user. The system administrator may further define such rules at different resolution level or different granularity level, for example, a first set of rules for interactions in a single page or a single form; a second set of rules for interactions across multiple pages or multiple forms that correspond to a single transaction (e.g., across all the forms or pages that are part of a Wire Transfer transaction); a third set of rules for interactions across multiple pages or multiple forms of an entire web-site or "app" or application (e.g., across all the forms or pages that are part of a particular banking application or banking website); or the like.

The manual definition of the threshold values or threshold ranges of values, may be based on one or more sources of information; for example, particular knowledge of the system administrator with regard to human capabilities in performing computerized interactions; list of world records in performing certain interactions (e.g., a world record of typing 216 words per minute, roughly equivalent to typing no more than 22 characters per second; thereby setting the threshold value of 22 characters per second as non-human interaction/fraud trigger); statistical data collected from the Internet, or from reliable sources, or from analysis of past interactions of multiple users of the website, indicating the average and/or median and/or maximum and/or minimum values that characterized past interactions, of a particular user (e.g., the user whose interactions are currently analyzed or examined), or of a group of users (e.g., all the users that performed a Wire Transfer in the past 12 months), or of an entirety of a population of users (e.g., all the users of a particular banking website).

The threshold values or ranges may be modified manually by the system administrator; or may be modified, increased and/or decreased dynamically by the system itself, autonomously and/or automatically, in order to ensure that not more than a pre-defined percentage of transactions are flagged as non-human interactions or as fraudulent interactions (e.g., the system may autonomously and dynamically increase the threshold value of humanly-possible clicks-per-second, from 14 to 23, in order to ensure that not more than 5 percent of the entire number of Wire Transfer transactions are flagged as non-human behavior). The dynamic modification of threshold values may be performed by a Threshold Values Dynamic Modification Module, which may run autonomously and monitor the number or the percentage of fraud-alerts that are generated by the system (e.g., per hour, or per number of interactions, or per number of transactions), and then modified, reduces or increases threshold values of rules, in order to achieve a desired percentage (or a desired range of percentage values) of interactions or transactions that are classified as fraudulent or as non-human interactions.

In some embodiments, a method comprises: (A) detecting an automated malware that emulates human interactions with a computerized service; wherein the detecting of step (A) comprises: (a) monitoring input-unit interactions of an electronic device that is utilized by a user to interact with said computerized service; (b) analyzing said input-unit interactions; (c) determining that it is humanly-impossible for a human to perform said input-user interactions; (d) based on the determining of step (c), determining that said input-unit interactions were necessarily performed by said automated script that emulates human interactions, and not by a human user.

In some embodiments, the method comprises: (i) detecting that the electronic device sends to a remote server, a message indicating that a string of characters was manually entered by a user in a particular field of a particular fillable form; (ii) based on monitoring of input-unit interactions of said electronic device, determining that the input unit of the electronic device registered manual input during the time-period that corresponds to alleged manual data entry of said particular field of said particular fillable form; and further determining that the manual input, as registered by the input unit of the electronic device, does not yield said string of characters that said message indicates as manually entered; (iii) based on steps (i) and (ii), further determining that said electronic device is necessarily controlled by an automated attacking module, and not by a legitimate human user.

In some embodiments, the method comprises: injecting an input-output aberration into a web-page; monitoring whether manual corrective actions were manually performed in response to input-output aberration; generating a list of usage sessions in which at least one of the following conditions holds true: (I) no corrective actions were performed, or (II) corrective actions that were performed were insufficient to adequately cure the input-output aberration; diluting said list of usage sessions, by removing usage sessions that do not exhibit a mismatch between (I) input-unit events as actually registered by one or more input units of the electronic device, and (II) content that was registered by the electronic device as allegedly being manually entered.

In some embodiments, the method comprises: generating a list of usage sessions that exhibit a mismatch between (I) input-unit events as actually registered by one or more input units of the electronic device, and (II) content that was registered by the electronic device as allegedly being manually entered; diluting said list of usage sessions by: (a) injecting an input-output aberration into a web-page, and monitoring whether manual corrective actions were manually performed in response to the input-output aberration; and (b) detecting that at least one of the following conditions holds true: (I) no corrective actions were performed, or (II) corrective actions that were performed were insufficient to adequately cure the input-output aberration.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The present invention may be implemented by using hardware units, software units, processors, CPUs, DSPs, integrated circuits, memory units, storage units, wireless communication modems or transmitters or receivers or transceivers, cellular transceivers, a power source, input units, output units, Operating System (OS), drivers, applications, and/or other suitable components.

The present invention may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

The present invention may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

The present invention may enable machines and/or computerized systems to have new capabilities and/or new functions that were not available to such machines or systems so far; including, for example: a new capability to correctly differentiate among multiple human users; a new capability for machines or computerized systems to differentiate between (I) a legitimate or "naïve" user, and (II) a fraudster or a human user having criminal intent or an illegitimate user; a new capability for machines or computerized systems allowing the machine or the computerized system to defend itself or to protect itself against cyber-attacks and/or illegitimate operations, and/or against impostors or identity-thieves or dishonest users; a new capability for machines or computerized systems to correctly identify and/or detect that a current user of an online resource or an online destination, is not the same human user that had accessed the same resource previously, even if the two access sessions were performed via the same device and/or via the same browser or application and/or from the same IP address and/or when the user/s are already logged-in and/or are already authenticated; a new capability for machines or computerized systems to defend or protect themselves against fraudulent transactions or criminal behavior or against hackers, crackers, human hackers, automated hacking tools, "bot" or other automated scripts; a new capability for machines or computerized systems to initiate and to perform fraud-mitigation operations based on analysis of user interactions; improved security and/or integrity and/or reliability of machines and computerized systems; and/or other new capabilities that conventional machines and conventional computerized systems do not have and that the present invention provides.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

In accordance with the present invention, a method comprises: (A) detecting an automated malware that emulates human interactions with a computerized service; wherein the detecting of step (A) comprises: (a) monitoring input-unit interactions of an electronic device that is utilized by a user to interact with said computerized service (e.g., by using a monitoring module that may be implemented via native code or JavaScript or HTML5 or Flash or other suitable technology, and may monitor and log all input-unit interactions and gestures that are performed manually on the end-user device); (b) injecting an input-output aberration into a web-page (e.g., causing an anomaly or abnormality between a manual gesture performed by the user via the input-unit and the output displayed on the screen), and monitoring whether or not manual corrective actions were manually performed in response to the input-output aberration (and optionally, monitoring whether the corrective action was adequate or sufficient to cure the aberration or anomaly; such as, whether a corrective action of dragging the mouse-pointer towards its intended position on a Submit button indeed caused the mouse-pointer to reach that Submit button); (c) analyzing said input-unit interactions; (d) determining that it is humanly-impossible for a human to perform said input-user interactions; (e) based on the determining of step (d), determining that said input-unit interactions were necessarily performed by said automated script that emulates human interactions, and not by a human user.

Some embodiments may utilize a binary classification engine, and/or a two-type or two-class look-up table, or a two-type or two-class ranges or values or pre-defined thresholds. For example, a first class or set-of-ranges includes numerical ranges or values or threshold(s) that a human user is certainly able to humanly/manually perform (e.g., able to move the on-screen pointer up to N pixels per T milliseconds; able to move the on-screen pointer up to 450 pixels within 7 milliseconds; able to perform up to K clicks or taps within T milliseconds; able to type up to M characters within T seconds; and so forth); whereas, a second class or set-of-ranges includes numerical ranges or values or thresholds that a human user is certainly unable to manually perform and/or that only an automated script or machine is able to perform (e.g., move the on-screen pointer more than N pixels per T milliseconds; perform more than K clicks or taps within T milliseconds; type more than M characters within T seconds; and so forth). The two-class classification engine may then analyze the captured input-unit(s) user interactions, may compare them to the corresponding range(s) or threshold value(s), and may thus determine whether at least one of the input-unit interactions belongs to the class of interactions that it is impossible for a human user to manually perform, thereby triggering a detection or determination that a non-human user (machine, bot, script) has performed such interaction(s).

Other embodiments may utilize a ternary classification engine, and/or a three-type or three-class look-up table, or a three-type or three-class ranges or values or pre-defined thresholds. For example, a first class or set-of-ranges includes numerical ranges or values or threshold(s) that a human user is certainly able to humanly/manually perform (e.g., able to move the on-screen pointer up to N1 pixels per T milliseconds; able to perform up to K1 clicks or taps within T milliseconds; able to type up to M1 characters within T seconds; and so forth); whereas, a second class or set-of-ranges includes numerical ranges or values or threshold that some humans can manually perform however they are still considered difficult or extremely difficult for most humans to perform and therefore classification into this second class (for a single interaction; or for several, at least K, interactions) may trigger a possible-fraud alert or a flagging of a transaction or a session for additional review of scrutiny (e.g., able to move the on-screen pointer between N1 to N2 pixels per T milliseconds; able to perform between K1 to K2 clicks or taps within T milliseconds; able to type between M1 to M2 characters within T seconds; and so forth); whereas a third class or set-of-ranges includes numerical ranges or values or thresholds that a human user is certainly unable to manually perform and/or that only an automated script or machine is able to perform (e.g., move the on-screen pointer more than N2 pixels per T milliseconds; perform more than K2 clicks or taps within T milliseconds; type more than M2 characters within T seconds; and so forth). The three-class classification engine may then analyze the captured input-unit(s) user interactions, may compare them to the corresponding range(s) or threshold value(s), and may thus determine whether at least one of the input-unit interactions belongs to the third class of interactions that it is impossible for a human user to manually perform, thereby triggering a detection or determination that a non-human user (machine, bot, script) has performed such interaction(s); or, may determine whether one or more of the input-unit interactions belongs to the second class of interactions that are very difficult for most humans to perform and thus they still trigger additional scrutiny or review or flagging of the transaction as possibly-fraudulent; or whether all of the interactions (or, at least P percent of the interactions of a user in a particular session, or across multiple sessions of that user) belong to the first class of certainly-human interactions; or the like.

In a demonstrative example, the three-class classification engine may utilize pre-defined set of ranges, indicating that it is certainly possible for a human to manually type up to 10 characters within 40 milliseconds (the first class); that it is humanly possible but it is very difficult and rare for a human to type 11 to 13 characters within 40 milliseconds (the second class); and that it is humanly impossible to type 14 characters or more within 40 milliseconds and only automated bots or scripts are capable of this (the third class). In some embodiments, the pre-defined thresholds or ranges may be determined by one or more suitable manners; for example, by sampling and analyzing a group or a population of users (e.g., 500 users) and/or usage-sessions (e.g., 600 usage sessions) and/or input-unit interactions (e.g., 50,000 keyboard typing of those users; 60,000 mouse-clicks of those users), and performing statistical analysis to establish these ranges. For example, 95 percent of the 500 users sampled, have typed up to 10 characters within 40 milliseconds, thereby enabling the system to define the threshold values or range for the first class; 5 percent of the 500 users sampled, have typed 11 to 13 characters per 40 milliseconds, thereby enabling the system to define the threshold values or range for the second class; and 0 percent of the 500 users sampled have types 14 or more characters per 40 milliseconds, thereby enabling the system to define the threshold values or range for the third class. In some embodiments, only sessions or interactions of verified transactions, that were reviewed and/or otherwise approved as human transactions, may be utilized for extracting or determining the threshold values or ranges. In some embodiments, other sources or resources may be utilized to establish the ranges or threshold values; such as, controlled experiments with humans; empirical studies and research papers; utilization of a "demo" or "beta" application or website that was provided to a focus group of human users; and/or other methods.

In some embodiments, the determining of step (e), that said input-unit interactions were necessarily performed by said automated script, is further based on: detecting that no manual corrective actions were performed via said input-unit in response to said input-output aberration.

In some embodiments, the determining of step (e), that said input-unit interactions were necessarily performed by said automated script, is further based on: detecting that corrective actions that were performed in response to said input-output aberration were insufficient to adequately cure the input-output aberration.

In some embodiments, the method comprises: detecting that said input-unit interactions comprise an on-screen displacement-jump of an on-screen pointer, from a first on-screen location, to a second and non-adjacent on-screen location; based on said on-screen displacement-jump of the on-screen pointer, determining that said input-unit interactions were necessarily performed by said automated script that emulates human interactions, and not by a human user.

In some embodiments, the method comprises: (i) detecting a first click or tap, performed at a first on-screen location; (ii) subsequently, detecting a second click or tap, performed at a second on-screen location; (iii) detecting that no input-unit events were registered between (I) detection of the first click or tap at the first on-screen location, and (II) detection of the second click or tap at the second on-screen location; (iv) based on step (iii), determining that said input-unit interactions were necessarily performed by said automated script that emulates human interactions, and not by a human user.

In some embodiments, the method comprises: (i) detecting a first click or tap, performed at a first on-screen location, occurred concurrently with a second click or tap performed at a second, different, on-screen location; (ii) based on step (i), determining that said input-unit interactions were necessarily performed by said automated script that emulates human interactions, and not by a human user.

In some embodiments, the method comprises: (i) monitoring key-down events, and key-up events, during a usage session in which said electronic device exhibits reception of keyboard input; (ii) determining that the number of key-down events does not match the number of key-up events, during said usage session; (iii) based on step (ii), determining that said input-unit interactions were necessarily performed by said automated script that emulates human interactions, and not by a human user.

In some embodiments, the method comprises: (i) monitoring key-down events, and monitoring key-up events, during a usage session in which said electronic device exhibits reception of keyboard input; (ii) determining that the order of the key-down events and the key-up events, during said usage session, does not match an expected order of key-down events and key-up events that is expected to be observed if an input unit of said electronic device is utilized for typing by a human user; (iii) based on step (ii), determining that said input-unit interactions were necessarily performed by said automated script that emulates human interactions, and not by a human user.

In some embodiments, the method comprises: (i) continuously monitoring mouse events, during a usage session in which said electronic device exhibits reception of mouse-based input; (ii) determining that during a first period of time within said usage session, the monitored mouse events exhibit a first sampling rate; (iii) determining that during a second period of time within said usage session, the monitored mouse events exhibit a second, different, sampling rate; (iv) based on steps (ii) and (iii), determining that said electronic device is necessarily controlled by an automated module, and not by a legitimate human user.

In some embodiments, the method comprises: (i) continuously monitoring keyboard events, during a usage session in which said electronic device exhibits reception of keyboard-based input; (ii) determining that during a first period of time within said usage session, the monitored keyboard events exhibit a first sampling rate; (iii) determining that during a second period of time within said usage session, the monitored keyboard events exhibit a second, different, sampling rate; (iv) based on steps (ii) and (iii), determining that said electronic device is necessarily controlled by an automated attacking module, and not by a legitimate human user.

In some embodiments, the method comprises: (i) detecting that an input-unit level of the electronic device reports that a message of M characters was manually entered via an input-unit of the electronic device; (ii) detecting that said electronic device sends to a remote server, an outgoing message of N characters that was allegedly typed on said electronic device, wherein N is different than M; (iii) based on the determining of steps (i) and (ii), further determining that said electronic device is necessarily controlled by an automated module, and not by a legitimate human user.

In some embodiments, a process comprises: (A) detecting an automated script that emulates human interactions with a computerized service; wherein the detecting of step (A) comprises: (a) monitoring input-unit interactions of an electronic device that is utilized by a user to interact with said computerized service; (b) classifying said monitored input-unit interactions, into one of three classes: (I) interactions that a human user is capable of performing via an input-unit; (II) interactions that are very difficult but still humanly-possible for a human user to perform via an input-unit; (III) interactions that it is physically impossible for a human user to perform via an input-unit; (c) upon detecting that a particular set of monitored input-unit interactions is in class (III), determining that said particular set of input-unit interactions were necessarily performed by said automated script, and not by a human user. In some embodiments, the classifying of step (b) is performed with regard to input-unit interactions that are monitored in response to an input-output aberration that was injected into a web-page or to an "app" or to an application element and that requires manual corrective actions.

In some embodiments, a method comprises: (A) detecting an automated script that emulates human interactions with a computerized service; wherein the detecting of step (A) comprises: (a) monitoring input-unit interactions of an electronic device that is utilized by a user to interact with said computerized service; (b) allocating to each monitored input-unit interaction, a respective score-value that quantifies, on a scale of M to N, how difficult it is for a human user to perform said input-unit interaction; (c) determining a weighted score that corresponds to a set of multiple monitored input-user interactions, based on the respective score-value of each one of said multiple monitored input-user interactions; (d) if said weighted score is greater than a threshold value, then determining that said set of multiple monitored input-unit interactions were necessarily performed by said automated script, and not by a human user. In some embodiments, the monitoring of step (a) comprises: monitoring input-unit interactions in response to an input-output aberration that was injected into a web-page or an "app" or application and that requires manual corrective actions.

In some embodiments, these operations may be performed by the classification engine, and/or by a weighting score allocator or other weighting module, which may utilize a pre-defined lookup table or database or ranges or threshold values to allocate or calculate the score. For example, a pre-defined set of ranges or threshold values, or a lookup table, may define that: (I) typing up to 5 characters per 50 seconds is most-certainly a human behavior and is associated with a fraud-score of 0 (on a scale of 0 to 100); whereas (II) typing between 6 to 8 characters per 50 milliseconds is manually possible but is rare (e.g., only 15 percent of the population is capable of this), and therefore it its associated with a fraud-score of 21 (on a scale of 0 to 100); whereas (III) typing between 9 to 13 characters per 50 milliseconds is manually possible but is extremely rare (e.g., only 2 percent of the population is capable of this), and therefore it its associated with a fraud-score of 68 (on a scale of 0 to 100); whereas (IV) typing more than 14 characters per 50 milliseconds is manually impossible (e.g., zero percent of a sampled population is capable of this), and therefore it its associated with a fraud-score of 100 or of 99 (on a scale of 0 to 100).

Then, optionally, a weighting module may generate a weighted fraud-score for multiple interactions of the same usage-session, and/or may generated a weighted fraud-score for multiple usage-sessions of the same user. For example, user Adam utilized a banking interface (website, application) for a usage-session of 4 minutes to perform a wire transfer; his keyboard interactions exhibited a fraud-score of 5, his mouse interactions exhibited a fraud-score of 78, and his touch-screen interactions exhibited a fraud score of 99; and thus his weighted fraud-score, based on pre-defined weighting factors, may be calculated to be 87; and since it is greater than a pre-defined threshold value (e.g., greater than 80) that a fraud/bot notification alert may be generated. The weighting factor(s) or coefficient(s) and/or the threshold values, may be fixedly pre-defined, or may dynamically change based on the context of the transaction; for example, a transaction of a first type (wire transfer) may be analyzed with a first set of weighting factors/coefficients, and/or may be compared to a first threshold value for fraud; whereas a transaction of a second type (view my balance) may be analyzed with a second set of weighting factors/coefficients, and/or may be compared to a second threshold value for fraud.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
(A) detecting an automated malware that emulates human interactions with a computerized service;
wherein the detecting of step (A) comprises:
(a) monitoring input-unit interactions of an electronic device that is utilized by a user to interact with said computerized service;
(b) injecting an input-output aberration into a web-page, and monitoring whether manual corrective actions were manually performed in response to the input-output aberration;
(c) analyzing said input-unit interactions;
(d) determining that it is humanly-impossible for a human to perform said input-user interactions;
(e) based on the determining of step (d), determining that said input-unit interactions were necessarily performed by said automated script that emulates human interactions, and not by a human user;
wherein the determining of step (e), that said input-unit interactions were necessarily performed by said automated script, is further based on: detecting that corrective actions that were performed in response to said input-output aberration were insufficient to adequately cure the input-output aberration.

2. A method comprising:
(A) detecting an automated malware that emulates human interactions with a computerized service;
wherein the detecting of step (A) comprises:
(a) monitoring input-unit interactions of an electronic device that is utilized by a user to interact with said computerized service;
(b) injecting an input-output aberration into a web-page, and monitoring whether manual corrective actions were manually performed in response to the input-output aberration;
(c) analyzing said input-unit interactions;
(d) determining that it is humanly-impossible for a human to perform said input-user interactions;
(e) based on the determining of step (d), determining that said input-unit interactions were necessarily performed by said automated script that emulates human interactions, and not by a human user;
wherein the method comprises:
(i) monitoring key-down events, and key-up events, during a usage session in which said electronic device exhibits reception of keyboard input;
(ii) determining that the number of key-down events does not match the number of key-up events, during said usage session;
(iii) based on step (ii), determining that said input-unit interactions were necessarily performed by said automated script that emulates human interactions, and not by a human user.

3. A method comprising:
(A) detecting an automated malware that emulates human interactions with a computerized service;
wherein the detecting of step (A) comprises:
(a) monitoring input-unit interactions of an electronic device that is utilized by a user to interact with said computerized service;
(b) injecting an input-output aberration into a web-page, and monitoring whether manual corrective actions were manually performed in response to the input-output aberration;
(c) analyzing said input-unit interactions;
(d) determining that it is humanly-impossible for a human to perform said input-user interactions;
(e) based on the determining of step (d), determining that said input-unit interactions were necessarily performed by said automated script that emulates human interactions, and not by a human user;
wherein the method comprises:
(i) monitoring key-down events, and monitoring key-up events, during a usage session in which said electronic device exhibits reception of keyboard input;
(ii) determining that the order of the key-down events and the key-up events, during said usage session, does not match an expected order of key-down events and key-up events that is expected to be observed if an input unit of said electronic device is utilized for typing by a human user;

(iii) based on step (ii), determining that said input-unit interactions were necessarily performed by said automated script that emulates human interactions, and not by a human user.

4. A method comprising:
(A) detecting an automated malware that emulates human interactions with a computerized service;
wherein the detecting of step (A) comprises:
(a) monitoring input-unit interactions of an electronic device that is utilized by a user to interact with said computerized service;
(b) injecting an input-output aberration into a web-page, and monitoring whether manual corrective actions were manually performed in response to the input-output aberration;
(c) analyzing said input-unit interactions;
(d) determining that it is humanly-impossible for a human to perform said input-user interactions;
(e) based on the determining of step (d), determining that said input-unit interactions were necessarily performed by said automated script that emulates human interactions, and not by a human user;
wherein the method comprises:
(i) continuously monitoring mouse events, during a usage session in which said electronic device exhibits reception of mouse-based input;
(ii) determining that during a first period of time within said usage session, the monitored mouse events exhibit a first sampling rate;
(iii) determining that during a second period of time within said usage session, the monitored mouse events exhibit a second, different, sampling rate;
(iv) based on steps (ii) and (iii), determining that said electronic device is necessarily controlled by an automated module, and not by a legitimate human user.

5. A method comprising:
(A) detecting an automated malware that emulates human interactions with a computerized service;
wherein the detecting of step (A) comprises:
(a) monitoring input-unit interactions of an electronic device that is utilized by a user to interact with said computerized service;
(b) injecting an input-output aberration into a web-page, and monitoring whether manual corrective actions were manually performed in response to the input-output aberration;
(c) analyzing said input-unit interactions;
(d) determining that it is humanly-impossible for a human to perform said input-user interactions;
(e) based on the determining of step (d), determining that said input-unit interactions were necessarily performed by said automated script that emulates human interactions, and not by a human user;
wherein the method comprises:
(i) continuously monitoring keyboard events, during a usage session in which said electronic device exhibits reception of keyboard-based input;
(ii) determining that during a first period of time within said usage session, the monitored keyboard events exhibit a first sampling rate;
(iii) determining that during a second period of time within said usage session, the monitored keyboard events exhibit a second, different, sampling rate;
(iv) based on steps (ii) and (iii), determining that said electronic device is necessarily controlled by an automated attacking module, and not by a legitimate human user.

6. A method comprising:
(A) detecting an automated malware that emulates human interactions with a computerized service;
wherein the detecting of step (A) comprises:
(a) monitoring input-unit interactions of an electronic device that is utilized by a user to interact with said computerized service;
(b) injecting an input-output aberration into a web-page, and monitoring whether manual corrective actions were manually performed in response to the input-output aberration;
(c) analyzing said input-unit interactions;
(d) determining that it is humanly-impossible for a human to perform said input-user interactions;
(e) based on the determining of step (d), determining that said input-unit interactions were necessarily performed by said automated script that emulates human interactions, and not by a human user;
wherein the method comprises:
(i) detecting that an input-unit level of the electronic device reports that a message of M characters was manually entered via an input-unit of the electronic device;
(ii) detecting that said electronic device sends to a remote server, an outgoing message of N characters that was allegedly typed on said electronic device, wherein N is different than M;
(iii) based on the determining of steps (i) and (ii), further determining that said electronic device is necessarily controlled by an automated module, and not by a legitimate human user.

7. A method comprising:
(A) detecting an automated script that emulates human interactions with a computerized service;
wherein the detecting of step (A) comprises:
(a) monitoring input-unit interactions of an electronic device that is utilized by a user to interact with said computerized service;
(b) allocating to each monitored input-unit interaction, a respective score-value that quantifies, on a scale of M to N, how difficult it is for a human user to perform said input-unit interaction;
(c) determining a weighted score that corresponds to a set of multiple monitored input-user interactions, based on the respective score-value of each one of said multiple monitored input-user interactions;
(d) if said weighted score is greater than a threshold value, then determining that said set of multiple monitored input-unit interactions were necessarily performed by said automated script, and not by a human user.

8. The method of claim 7,
wherein the monitoring of step (a) comprises: monitoring input-unit interactions in response to an input-output aberration that was injected into a web-page and that requires manual corrective actions.

9. The method of claim 7,
wherein the monitoring of step (a) comprises: monitoring input-unit interactions in response to an input-output aberration that was injected into an application element and that requires manual corrective actions.

* * * * *